US008547595B2

(12) United States Patent
Sakamoto

(10) Patent No.: US 8,547,595 B2
(45) Date of Patent: Oct. 1, 2013

(54) IMAGE FORMING APPARATUS FOR PERFORMING A PROCESS OF SUPERIMPOSING PIXEL DATA BASED ON PIXEL DIRECTION

(75) Inventor: Akira Sakamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 787 days.

(21) Appl. No.: 12/756,778

(22) Filed: Apr. 8, 2010

(65) Prior Publication Data
US 2010/0259775 A1 Oct. 14, 2010

(30) Foreign Application Priority Data

Apr. 9, 2009 (JP) ................................. 2009-095182

(51) Int. Cl.
H04N 1/60 (2006.01)
(52) U.S. Cl.
USPC .......... 358/1.9; 358/3.06; 358/3.27; 358/3.28; 358/540
(58) Field of Classification Search
None
See application file for complete search history.

(56) References Cited

U.S. PATENT DOCUMENTS

| 6,377,711 B1 * | 4/2002 | Morgana ....................... 382/274 |
| 6,549,303 B1 * | 4/2003 | Trask ............................. 358/1.9 |
| 6,781,720 B1 * | 8/2004 | Klassen ....................... 358/3.27 |
| 6,992,798 B2 * | 1/2006 | Geurts et al. ................. 358/3.15 |
| 7,139,098 B2 * | 11/2006 | Klassen ........................ 358/1.9 |
| 7,672,013 B2 * | 3/2010 | Accad et al. ................... 358/1.9 |
| 8,223,402 B2 * | 7/2012 | Yao ............................... 358/3.06 |
| 8,340,396 B2 * | 12/2012 | Yao ............................... 382/149 |
| 2003/0193497 A1 * | 10/2003 | Yhann ........................... 345/419 |
| 2008/0158614 A1 | 7/2008 | Segawa |
| 2010/0259771 A1 * | 10/2010 | Sakamoto ....................... 358/1.2 |

FOREIGN PATENT DOCUMENTS

| JP | 2002-165104 A | 6/2002 |
| JP | 2008-166967 A | 7/2008 |

* cited by examiner

Primary Examiner — Dung Tran
(74) Attorney, Agent, or Firm — Birch, Stewart, Kolasch & Birch, LLP

(57) ABSTRACT

A trapping determination process section calculates edge intensities in a main scanning direction and a sub scanning direction of each pixel by using differential filters for each color plane. The trapping determination process section determines, for at least two color planes, whether there is a pixel where the absolute values of the edge intensities are equal to or greater than a threshold and the edge intensities take positive and negative values, respectively. When such a pixel exists, the trapping determination process section calculates color differences between this pixel and the average values of the pixel values in an increment direction region and a decrement direction region, and determines a direction in which the color difference is smaller to be a similar color direction. The trapping determination process section determines, on the basis of the similar color direction, whether or not to perform a trapping process, and performs the trapping process.

15 Claims, 30 Drawing Sheets

| -1 | -1 | 0 | 1 | 1 |
|---|---|---|---|---|
| -1 | -1 | 0 | 1 | 1 |
| -1 | -1 | 0 | 1 | 1 |
| -1 | -1 | 0 | 1 | 1 |
| -1 | -1 | 0 | 1 | 1 |

FIG.5B

| -1 | -1 | -1 | -1 | -1 |
|---|---|---|---|---|
| -1 | -1 | -1 | -1 | -1 |
| 0 | 0 | 0 | 0 | 0 |
| 1 | 1 | 1 | 1 | 1 |
| 1 | 1 | 1 | 1 | 1 |

FIG.6

|   | 4 | 5 | 6 | 7 | 8 |
|---|---|---|---|---|---|
| 6 | 255  −255<br><br>255  −255 | 765  −765<br><br>765  −765 | 1275 −1275<br><br>1275 −1275 | 1530 −1530<br><br>1530 −1530 | 1530 −1530<br><br>1530 −1530 |
| 7 | 765  −765<br><br>765  −765 | 1275 −1275<br><br>1275 −1275 | 1530 −1530<br><br>1530 −1530 | 1530 −1530<br><br>1530 −1530 | 1275 −1275<br><br>1275 −1275 |
| 8 | 1275 −1275<br><br>1275 −1275 | 1530 −1530<br><br>1530 −1530 | 1530 −1530<br><br>1530 −1530 | 1275 −1275<br><br>1275 −1275 | 765  −765<br><br>765  −765 |
| 9 | 1275 −1275<br><br>510  −510 | 1530 −1530<br><br>255  −255 | 1275 −1275<br><br>0    0 | 765  −765<br><br>−510  510 | 255  −255<br><br>−1020 1020 |
| 10 | 1275 −1275<br><br>−765 −765 | 1275 −1275<br><br>−1275 −1275 | 765  −765<br><br>−1785 1785 | 255  −255<br><br>−2295 2295 | 0    0<br><br>−2550 2550 |

| C<br>EDGE INTENSITY IN<br>THE MAIN SCANNING<br>DIRECTION | M<br>EDGE INTENSITY IN<br>THE MAIN SCANNING<br>DIRECTION |
|---|---|
| C<br>EDGE INTENSITY IN<br>THE SUB SCANNING<br>DIRECTION | M<br>EDGE INTENSITY IN<br>THE SUB SCANNING<br>DIRECTION |

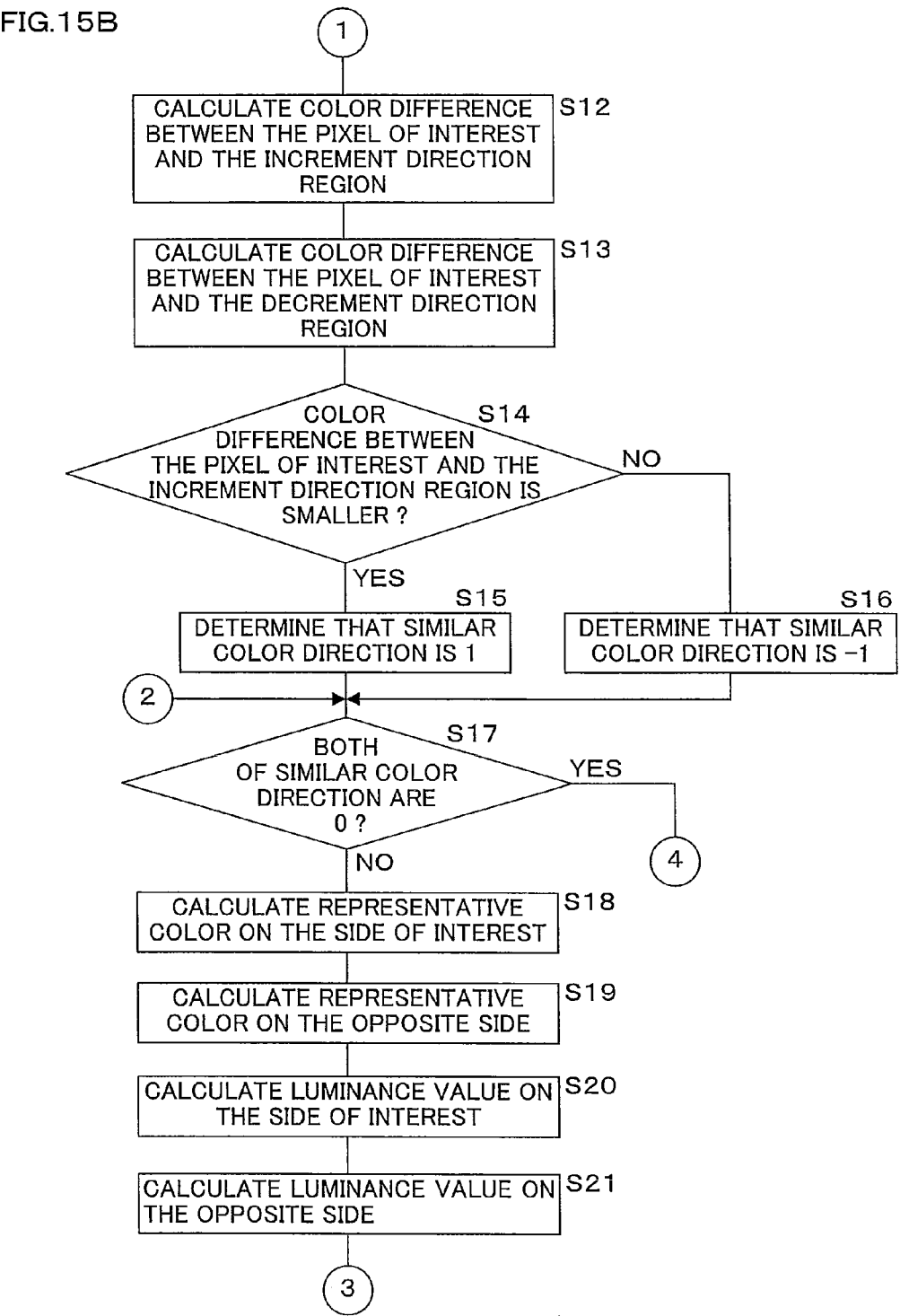

FIG.20
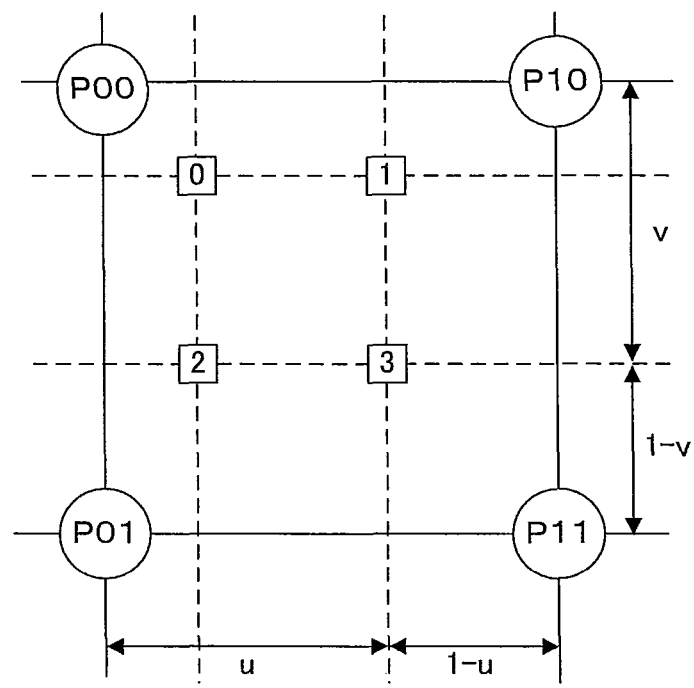
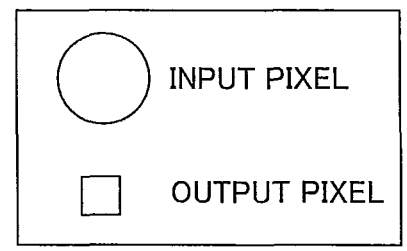
INPUT PIXEL
OUTPUT PIXEL

≡ COLOR DIFFERENCE IS CLOSER TO M

||| COLOR DIFFERENCE IS CLOSER TO C

▩ COLOR DIFFERENCE IS INTERMEDIATE VALUE BETWEEN C AND M

FIG.22

|    | 8 | 9 | 10 | 11 | 12 | 13 | 14 | 15 | 16 | 17 |
|----|---|---|----|----|----|----|----|----|----|----|
| 12 | 0 / 255 | 0 / 255 | 0 / 255 | 0 / 255 | 0 / 255 | 0 / 255 | 0 / 255 | 128 / 128 | 255 / 0 | 255 / 0 |
| 13 | 0 / 255 | 0 / 255 | 0 / 255 | 0 / 255 | 0 / 255 | 64 / 191 | 128 / 128 | 191 / 64 | 255 / 0 | 255 / 0 |
| 14 | 0 / 255 | 0 / 255 | 0 / 255 | 0 / 255 | 0 / 255 | 128 / 128 | 255 / 0 | 255 / 0 | 255 / 0 | 255 / 0 |
| 15 | 0 / 255 | 0 / 255 | 0 / 255 | 64 / 191 | 128 / 128 | 191 / 64 | 255 / 0 | 255 / 0 | 255 / 0 | 255 / 0 |
| 16 | 0 / 255 | 0 / 255 | 0 / 255 | 128 / 128 | 255 / 0 | 255 / 0 | 255 / 0 | 255 / 0 | 255 / 0 | 255 / 0 |
| 17 | 0 / 255 | 64 / 191 | 128 / 128 | 191 / 64 | 255 / 0 | 255 / 0 | 255 / 0 | 255 / 0 | 255 / 0 | 255 / 0 |
| 18 | 0 / 255 | 128 / 128 | 255 / 0 | 255 / 0 | 255 / 0 | 255 / 0 | 255 / 0 | 255 / 0 | 255 / 0 | 255 / 0 |
| 19 | 128 / 128 | 191 / 64 | 255 / 0 | 255 / 0 | 255 / 0 | 255 / 0 | 255 / 0 | 255 / 0 | 255 / 0 | 255 / 0 |
| 20 | 255 / 0 | 255 / 0 | 255 / 0 | 255 / 0 | 255 / 0 | 255 / 0 | 255 / 0 | 255 / 0 | 255 / 0 | 255 / 0 |
| 21 | 128 / 128 | 128 / 128 | 128 / 128 | 128 / 128 | 128 / 128 | 128 / 128 | 128 / 128 | 128 / 128 | 128 / 128 | 128 / 128 |
| 22 | 0 / 255 | 0 / 255 | 0 / 255 | 0 / 255 | 0 / 255 | 0 / 255 | 0 / 255 | 0 / 255 | 0 / 255 | 0 / 255 |

C PIXEL VALUE

M PIXEL VALUE

FIG.23

|    | 8 | 9 | 10 | 11 | 12 | 13 | 14 | 15 | 16 | 17 |
|----|---|---|----|----|----|----|----|----|----|----|
| 12 | 0<br>255 | 0<br>255 | 0<br>255 | 0<br>255 | 0<br>255 | 0<br>255 | 0<br>255 | 255<br>0 | 255<br>0 | 255<br>0 |
| 13 | 0<br>255 | 0<br>255 | 0<br>255 | 0<br>255 | 0<br>255 | 0<br>255 | 255<br>0 | 255<br>0 | 255<br>0 | 255<br>0 |
| 14 | 0<br>255 | 0<br>255 | 0<br>255 | 0<br>255 | 0<br>255 | 255<br>0 | 255<br>0 | 255<br>0 | 255<br>0 | 255<br>0 |
| 15 | 0<br>255 | 0<br>255 | 0<br>255 | 0<br>255 | 255<br>0 | 255<br>0 | 255<br>0 | 255<br>0 | 255<br>0 | 255<br>0 |
| 16 | 0<br>255 | 0<br>255 | 0<br>255 | 255<br>0 | 255<br>0 | 255<br>0 | 255<br>0 | 255<br>0 | 255<br>0 | 255<br>0 |
| 17 | 0<br>255 | 0<br>255 | 255<br>0 | 255<br>0 | 255<br>0 | 255<br>0 | 255<br>0 | 255<br>0 | 255<br>0 | 255<br>0 |
| 18 | 0<br>255 | 255<br>0 | 255<br>0 | 255<br>0 | 255<br>0 | 255<br>0 | 255<br>0 | 255<br>0 | 255<br>0 | 255<br>0 |
| 19 | 255<br>0 | 255<br>0 | 255<br>0 | 255<br>0 | 255<br>0 | 255<br>0 | 255<br>0 | 255<br>0 | 255<br>0 | 255<br>0 |
| 20 | 255<br>0 | 255<br>0 | 255<br>0 | 255<br>0 | 255<br>0 | 255<br>0 | 255<br>0 | 255<br>0 | 255<br>0 | 255<br>0 |
| 21 | 0<br>255 | 0<br>255 | 0<br>255 | 0<br>255 | 0<br>255 | 0<br>255 | 0<br>255 | 0<br>255 | 0<br>255 | 0<br>255 |

C
PIXEL VALUE

M
PIXEL VALUE

FIG.24

| | 8 | 9 | 10 | 11 | 12 | 13 | 14 | 15 | 16 | 17 |
|---|---|---|---|---|---|---|---|---|---|---|
| 12 | 64<br>191 | 191<br>64 | 191<br>64 | 255<br>0 | 255<br>0 | 255<br>0 | 255<br>0 | 0<br>0 | 0<br>0 | 0<br>0 |
| 13 | 191<br>64 | 255<br>0 | 255<br>0 | 255<br>0 | 255<br>0 | 0<br>0 | 0<br>0 | 0<br>0 | 0<br>0 | 0<br>0 |
| 14 | 191<br>64 | 255<br>0 | 255<br>0 | 255<br>0 | 255<br>0 | 0<br>0 | 0<br>0 | 0<br>0 | 0<br>0 | 0<br>0 |
| 15 | 255<br>0 | 255<br>0 | 255<br>0 | 0<br>0 | 0<br>0 | 0<br>0 | 0<br>0 | 0<br>0 | 0<br>0 | 0<br>0 |
| 16 | 255<br>0 | 255<br>0 | 255<br>0 | 0<br>0 | 0<br>0 | 0<br>0 | 0<br>0 | 0<br>0 | 0<br>0 | 0<br>0 |
| 17 | 128<br>128 | 0<br>0 | 0<br>0 | 0<br>0 | 0<br>0 | 0<br>0 | 0<br>0 | 0<br>0 | 0<br>0 | 0<br>0 |
| 18 | 128<br>128 | 0<br>0 | 0<br>0 | 0<br>0 | 0<br>0 | 0<br>0 | 0<br>0 | 0<br>0 | 0<br>0 | 0<br>0 |
| 19 | 0<br>0 | 0<br>0 | 0<br>0 | 0<br>0 | 0<br>0 | 0<br>0 | 0<br>0 | 0<br>0 | 0<br>0 | 0<br>0 |
| 20 | 0<br>0 | 0<br>0 | 0<br>0 | 0<br>0 | 0<br>0 | 0<br>0 | 0<br>0 | 0<br>0 | 0<br>0 | 0<br>0 |
| 21 | 255<br>0 | 255<br>0 | 255<br>0 | 255<br>0 | 255<br>0 | 255<br>0 | 255<br>0 | 255<br>0 | 255<br>0 | 255<br>0 |

C PIXEL VALUE

M PIXEL VALUE

FIG.25

|    | 8 | 9 | 10 | 11 | 12 | 13 | 14 | 15 | 16 | 17 |
|----|---|---|----|----|----|----|----|----|----|----|
| 12 | 64 / 255 | 191 / 255 | 191 / 255 | 255 / 255 | 255 / 255 | 255 / 255 | 255 / 255 | 255 / 0 | 255 / 0 | 255 / 0 |
| 13 | 191 / 255 | 255 / 255 | 255 / 255 | 255 / 255 | 255 / 255 | 0 / 255 | 255 / 0 | 255 / 0 | 255 / 0 | 255 / 0 |
| 14 | 191 / 255 | 255 / 255 | 255 / 255 | 255 / 255 | 255 / 255 | 255 / 0 | 255 / 0 | 255 / 0 | 255 / 0 | 255 / 0 |
| 15 | 255 / 255 | 255 / 255 | 255 / 255 | 0 / 255 | 255 / 0 | 255 / 0 | 255 / 0 | 255 / 0 | 255 / 0 | 255 / 0 |
| 16 | 255 / 255 | 255 / 255 | 255 / 255 | 255 / 0 | 255 / 0 | 255 / 0 | 255 / 0 | 255 / 0 | 255 / 0 | 255 / 0 |
| 17 | 128 / 255 | 0 / 255 | 255 / 0 | 255 / 0 | 255 / 0 | 255 / 0 | 255 / 0 | 255 / 0 | 255 / 0 | 255 / 0 |
| 18 | 128 / 255 | 255 / 0 | 255 / 0 | 255 / 0 | 255 / 0 | 255 / 0 | 255 / 0 | 255 / 0 | 255 / 0 | 255 / 0 |
| 19 | 255 / 0 | 255 / 0 | 255 / 0 | 255 / 0 | 255 / 0 | 255 / 0 | 255 / 0 | 255 / 0 | 255 / 0 | 255 / 0 |
| 20 | 255 / 0 | 255 / 0 | 255 / 0 | 255 / 0 | 255 / 0 | 255 / 0 | 255 / 0 | 255 / 0 | 255 / 0 | 255 / 0 |
| 21 | 255 / 255 | 255 / 255 | 255 / 255 | 255 / 255 | 255 / 255 | 255 / 255 | 255 / 255 | 255 / 255 | 255 / 255 | 255 / 255 |

C PIXEL VALUE
M PIXEL VALUE

IMAGE FORMING APPARATUS FOR PERFORMING A PROCESS OF SUPERIMPOSING PIXEL DATA BASED ON PIXEL DIRECTION

CROSS-REFERENCE TO RELATED APPLICATION

This Non-provisional application claims priority under 35 U.S.C. §119(a) on Patent Application No. 2009-095182 filed in Japan on Apr. 9, 2009, the entire contents of which are hereby incorporated by reference.

BACKGROUND

1. Technical Field

The present invention relates to an image processing apparatus, an image forming apparatus, and a memory product for performing a process of superimposing pixel data of a plurality of color components.

2. Description of Related Art

A trapping process, a smoothing process etc. are proposed to prevent degradation of image quality of an image formed on a paper medium by an image forming apparatus, such as a copying machine and a printer. The process of superimposing pixel data of a plurality of color components (hereinafter referred to as the trapping process) is a process for preventing white gaps from appearing when a misregistration occurs and a page background has been exposed. The smoothing process is a process for improving the resolution while reducing jaggies (stair-stepping edges appearing in curved or sloping lines of text or an image).

As an apparatus for performing the trapping process, there is proposed an apparatus which automatically extracts a boundary at which the trapping process is to be performed, specifies a trap region where the trapping process is to be performed, and specifies a trap color for each trap region (see, for example, Japanese Patent Application Laid Open No. 2002-165104). With such an image forming apparatus, even if a misregistration occurs when printing a color image, occurrence of white gaps is reduced.

SUMMARY

According to Japanese Patent Application Laid Open No. 2002-165104, after extracting a boundary (edge) at which the trapping process is to be performed, pixels within a given distance from the extracted boundary are specified when specifying a trap region. However, any specific method for this is not disclosed. For example, after extracting a boundary, if pixels which are located within a given distance from pixels on the boundary and to be the color in the boundary are specified for a trap region, the trap region and the trap color are specified on a page-by-page basis. It is therefore difficult to perform a pipeline process on a pixel-by-pixel basis.

In addition, after completing the process for one point on the boundary, it is necessary to perform the process for a different point on the boundary, and thus the processing time depends on the number of the pixels on the boundary and the number of pixels located within a given distance from the center of each of the pixels. Therefore, since the maximum processing time necessary for the trapping process is unpredictable, the configuration disclosed in Japanese Patent Application Laid Open No. 2002-165104 is not suitable for real-time processing.

The present invention has been made with the aim of solving the above problems, and it is an object of the present invention to provide an image processing apparatus, an image forming apparatus, an image processing method, and a memory product, which are capable of performing pipeline processing on a pixel-by-pixel basis and real-time processing by performing each process on a pixel-by-pixel basis.

An image processing apparatus according to the present invention is an image processing apparatus for performing a process of superimposing a pixel having a plurality of color components on an edge extracted from input image data including a plurality of color components, and characterized by including: an edge determination section for determining whether or not a pixel of interest in the input image data is a pixel constituting an edge that satisfies a given condition; an edge direction determination section for determining a direction in which a surrounding pixel having a color similar to a color of the pixel of interest among pixels surrounding the pixel of interest is present when the edge determination section determines that the pixel of interest is a pixel constituting an edge that satisfies the given condition; a process determination section for determining, on the basis of the direction determined by the edge direction determination section, whether or not to perform a process of superimposing a pixel having a plurality of color components on the pixel of interest; a determination section for determining color components of a superimposing pixel when the process determination section determines to perform the superimposing process; and a superimposing process section for performing the process of superimposing pixel data having the color components determined by the determination section on the pixel of interest.

The image processing apparatus according to the present invention is characterized in that the edge determination section determines whether or not the pixel of interest is a pixel constituting an edge where a white gap appears when a misregistration occurs between data of different color components of the input image data and a page background has been exposed.

The image processing apparatus according to the present invention is characterized in that the edge determination section includes: an edge intensity calculation section for calculating, for each pixel of interest, edge intensities indicating a degree of change between a pixel value of the pixel of interest and pixel values of pixels surrounding the pixel of interest by using differential filters for each color component of the input image data, wherein when at least one of the edge intensities of respective color components calculated by the edge intensity calculation section is a positive value and the absolute value of the positive value is equal to or greater than a given value and at least one of the edge intensities of the respective color components is a negative value and the absolute value of the negative value is equal to or greater than the given value, the edge determination section determines that the pixel of interest is a pixel constituting an edge that satisfies the given condition.

The image processing apparatus according to the present invention is characterized in that the edge direction determination section determines a direction in which a surrounding pixel having a color more similar to a color of the pixel of interest is present, on the basis of a difference between a pixel value of the pixel of interest and an average value of pixel values of pixels in a first region adjacent to the pixel of interest, and a difference between the pixel value of the pixel of interest and an average value of pixel values of pixels in a second region different from the first region and adjacent to the pixel of interest.

The image processing apparatus according to the present invention is characterized in that the process determination section includes: a representative pixel value calculation section for calculating, on the basis of pixel values of pixels in a first region and a second region preset for the pixel of interest according to a direction determined by the edge direction determination section, a representative pixel value of each of color components in the first region and the second region; a luminance value calculation section for calculating luminance values in the first region and the second region on the basis of the representative pixel values of the respective color components in the first region and the second region calculated by the representative pixel value calculation section; and a comparing section for comparing the luminance values in the first region and the second region calculated by the luminance value calculation section, wherein if the luminance value in the first region is smaller than the luminance value in the second region as a result of the comparison in the comparing section, the process determination section determines to perform the superimposing process, and the determination section determines color components of the superimposing pixel on the basis of the representative pixel values of the respective color components in the second region calculated by the representative pixel value calculation section.

The image processing apparatus according to the present invention is characterized in that the representative pixel value calculation section calculates an average value of pixel values of pixels in each of the first region and the second region including a plurality of pixels, or a pixel value of a pixel in each of the first region and the second region including a single pixel, as the representative pixel value of each color component in the first region and the second region.

The image processing apparatus according to the present invention is characterized in that the first region and the second region set for the pixel of interest are regions located at symmetrical positions with respect to the pixel of interest.

An image forming apparatus according to the present invention is characterized by including any one of the above-described image processing apparatuses, and image forming means for forming an output image on the basis of image data processed in the image processing apparatus.

An image processing method according to the present invention is an image processing method for performing a process of superimposing a pixel having a plurality of color components on an edge extracted from input image data including a plurality of color components, and characterized by including: an edge determination step of determining whether or not a pixel of interest in the input image data is a pixel constituting an edge that satisfies a given condition; an edge direction determination step of determining, when it is determined in the edge determination step that the pixel of interest is a pixel constituting an edge that satisfies the given condition, a direction in which a surrounding pixel having a color similar to a color of the pixel of interest among pixels surrounding the pixel of interest is present; a process determination step of determining, on the basis of the direction determined in the edge direction determination step, whether or not to perform a process of superimposing a pixel having a plurality of color components on the pixel of interest; a determination step of determining color components of a superimposing pixel when it is determined in the process determination step to perform the superimposing process; and a superimposing process step of performing the process of superimposing pixel data having the color components determined in the determination step on the pixel of interest.

A memory product according to the present invention is a computer-readable memory product, and characterized by storing a computer program readable and executable by a computer to enable the computer to perform: an edge determination step of determining whether or not a pixel of interest in input image data is a pixel constituting an edge that satisfies a given condition; an edge direction determination step of determining, when it is determined in the edge determination step that the pixel of interest is a pixel constituting an edge that satisfies the given condition, a direction in which a surrounding pixel having a color similar to a color of the pixel of interest among pixels surrounding the pixel of interest is present; a process determination step of determining, on the basis of the direction determined in the edge direction determination step, whether or not to perform a process of superimposing a pixel having a plurality of color components on the pixel of interest; a determination step of determining color components of a superimposing pixel when it is determined in the process determination step to perform the superimposing process; and a superimposing process step of performing the process of superimposing pixel data having the color components determined in the determination step on the pixel of interest.

When each pixel of interest in the input image data is a pixel constituting an edge that satisfies a given condition (when the pixel of interest is an edge satisfying the given condition), the image processing apparatus of the present invention determines the direction of a surrounding pixel having a color similar to the color of the pixel of interest among surrounding pixels with respect to this pixel of interest. The image processing apparatus also determines, on the basis of the determined direction, whether or not to perform the process of superimposing a pixel having a plurality of color components (the trapping process) on the pixel of interest. If it is determined to perform the trapping process, the image processing apparatus determines a superimposing color (trap color) and superimposes the pixel data having the determined color components on the pixel of interest in the input image data.

In short, the image processing apparatus of the present invention makes a determination as to whether or not to perform the trapping process (hereinafter referred to as the trap determination) for an edge satisfying the given condition, and calculates the trap color. The given condition is, for example, whether or not a white gap, which occurs when a page background has been exposed, appears when a misregistration occurs between data of different color components. Hence, an edge where a white gap appears when a misregistration occurs between data of different color components is automatically detected, and the trapping process is performed for the detected edge, thereby preventing white gaps caused by misregistration.

By determining whether or not each of the absolute values of the edge intensities calculated using differential filters is equal to or greater than a given value, the image processing apparatus of the present invention accurately detects areas where white gaps appear when a misregistration occurs. Moreover, by confirming the presence of both of positive and negative edge intensities, the image processing apparatus avoids performing the trapping process for areas where the trapping process is unnecessary. The areas where the trapping process is unnecessary include, for example, an area surrounding a red (composed of magenta and yellow) object on a white background. In such an area, even when a magenta or yellow registration error occurs, a white gap does not appear, and therefore the trapping process is unnecessary. Hence, in such an area, although two edges of magenta and yellow are present, they both have a positive edge intensity, or a negative edge intensity, and are not subject to the trapping process.

By comparing the color difference between the pixel value of the pixel of interest and the average value of the pixel values of the pixels in the first region of a given size with the color difference between the pixel value of the pixel of interest and the average value of the pixel values of the pixels in the second region, the image processing apparatus of the present invention determines a stable edge direction with respect to the pixel of interest.

By superimposing a color with a high luminance value over a color having low luminance value, the present invention implements the trapping process which does not change the size of an object. Or, by determining the color in a region with a smaller luminance value to be the trap color, the color in the opposite side of the pixel of interest is precisely selected as the trap color.

In the present invention, as a method for calculating a representative pixel value (representative color), an area type method or a point type method is selected and set depending on which problem should be given priority between image quality degradation caused by a false color when a small misregistration occurs and image quality degradation caused by a white gap when a large misregistration occurs.

In the present invention, the determination as to whether or not a pixel is an edge satisfying the given condition, the determination of the edge direction of each edge, the determination as to whether or not to perform the trapping process, the determination of the trap color, and the trapping process are executed on a pixel-by-pixel basis. Accordingly, it is possible to perform a pipe line process on a pixel-by-pixel basis. Further, since similar processes are performed for each pixel, a maximum processing time necessary for each pixel is predictable and real-time processing is achieved.

The above and further objects and features of the invention will more fully be apparent from the following detailed description with accompanying drawings.

BRIEF DESCRIPTION OF THE SEVERAL VIEWS OF THE DRAWINGS

FIG. 4 is a view schematically illustrating one example of input image data;

FIGS. 5A and 5B are views schematically illustrating one example of differential filters;

FIG. 6 is a view illustrating a part of the results of calculating the edge intensities for the input image data of FIG. 4 by using the differential filters of FIGS. 5A and 5B;

FIGS. 15A, 15B and 15C are flowcharts illustrating a trapping determination process to be performed by the color image processing apparatus;

FIG. 20 is a schematic view for explaining data interpolation in a smoothing process;

FIG. 22 is a view illustrating the results of bilinear interpolation performed for the input image data of FIG. 4;

FIG. 23 is a view illustrating a part of the processing results of copying a pixel having a color closer to the pixel of interest in the image data of FIG. 22;

FIG. 24 is a view illustrating a part of the upsampling results;

FIG. 25 is a view illustrating a part of the results of performing a trapping and superimposing process for the image after the smoothing process, on the basis of the upsampling result, when the input image data had low resolution and the output image had high resolution;

DETAILED DESCRIPTION

The following will describe in detail an image processing apparatus, an image processing method, an image forming apparatus, a computer program, and a memory product according to the present invention with reference to the drawings illustrating some embodiments thereof.

Embodiment 1

Figure 1:
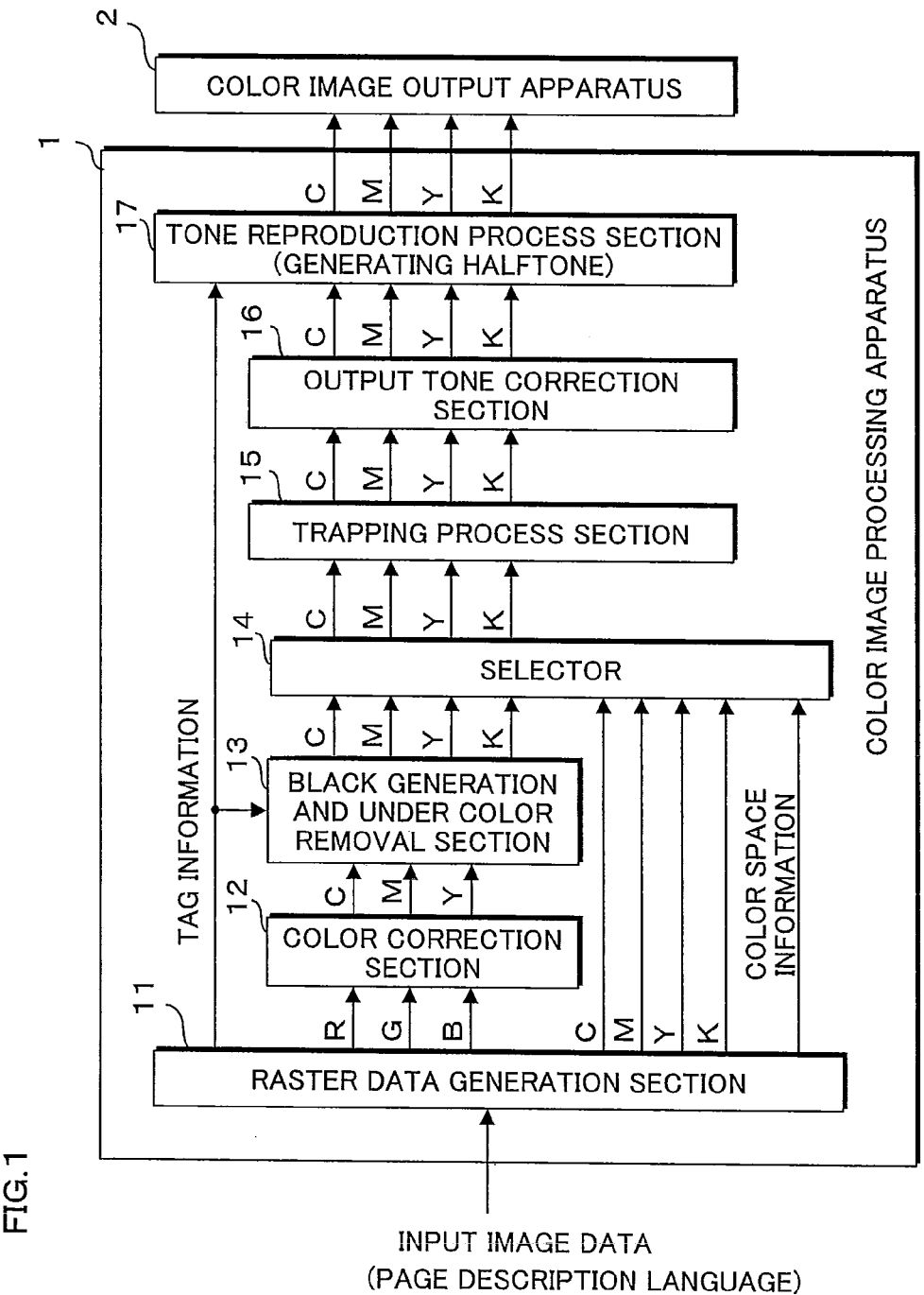
FIG. 1 is a block diagram illustrating the configuration of a color image forming apparatus according to Embodiment 1.

A color image forming apparatus according to Embodiment 1 will be explained below. FIG. 1 is a block diagram illustrating the configuration of the color image forming apparatus according to Embodiment 1. The color image forming apparatus of Embodiment 1 performs image processing for entered image data (hereinafter referred to as the input image data) and forms a color image on the basis of the processed image data on a sheet of recording paper etc. The input image data is created using application software, such as image editing software, on a computer, not shown. The created input image data is converted to a page description language by a printer driver and transmitted from the computer to the color image forming apparatus through a network.

As illustrated in FIG. 1, the color image forming apparatus comprises a color image processing apparatus 1 for processing input image data, and a color image output apparatus (image forming means) 2 for forming an image on the basis of the image data processed by the color image processing apparatus 1. The color image output apparatus 2 is, for example, an electrophotographic type or an inkjet type printer for forming an image on a sheet, such as recording paper and an OHP sheet, or the color image output apparatus 2 may be a display device, such as a display.

The color image processing apparatus 1 comprises a raster data generation section 11, a color correction section 12, a black generation and under color removal section 13, a selector 14, a trapping process section 15, an output tone correction section 16, and a tone reproduction process section 17.

The raster data generation section 11 analyzes an input page description language and generates RGB (R: red, G: green, B: blue) or CMYK (C: cyan, M: magenta, Y: yellow, K: black) raster data. If RGB raster data is generated, the raster data generation section 11 outputs the generated raster data to the color correction section 12. On the other hand, if CMYK raster data is generated, the raster data generation section 11 outputs the generated raster data to the selector 14.

The raster data generation section 11 also obtains color space information of the input image data, and outputs the obtained color space information to the selector 14. In addition, the raster data generation section 11 generates tag information indicating to which of a text region, a vector/graphics region, a photograph region and other region each pixel in the raster data belongs, and outputs it to the black generation and under color removable section 13 and the tone reproduction process section 17.

In order to realize faithful color reproduction, the color correction section 12 performs the process of removing color impurity on the basis of spectral characteristics of CMY color materials containing useless absorption components. The color correction section 12 outputs the corrected CMY signals representing three colors to the black generation and under color removal section 13.

The black generation and under color removal section 13 performs a black generation process for generating a black (K) signal from the color-corrected CMY signals, and a process for generating new CMY signals by removing the K signal from the original CMY signals. Thus, the CMY signals representing three colors are converted to CMYK signals representing four colors. The black generation and under color removal section 13 outputs the generated CMYK signals to the selector 14.

The black generation and under color removal section 13 generates the black signal by, for example, a Skelton black process. In this method, if the input and output characteristics of a Skelton curve are represented by y=f(x), input data are C, M, Y, output data are C', M', Y', K', and the UCR (Under Color Removal) ratio is $\alpha$ ($0<\alpha<1$), then the data output by the black generation and under color removal process are expressed by $$K'=f\{\min(C,M,Y)\}, C'=C-\alpha K', M'=M-\alpha K', \text{ and } Y'=Y-\alpha K'$$

The raster data generation section 11 and the black generation and under color removal section 13 respectively input the CMYK signals to the selector 14, and the selector 14 outputs either of the CMYK signals on the basis of the color space information from the raster data generation section 11. If the color space information is RGB, then the selector 14 outputs the CMYK signals input from the black generation and under color removal section 13 to the trapping process section 15. If the color space information is CMYK, then the selector 14 outputs the CMYK signals input directly from the raster data generation section 11 to the trapping process section 15.

Thus, if the color space information of the input image data is CMYK, the CMYK signals which were not processed in the color correction section 12 and the black generation and under color removal section 13 are input to the trapping process section 15.

The trapping process section 15 performs a trapping process for the input raster data to prevent white gaps caused by misregistration. Then, the trapping process section 15 outputs the processed CMYK signals to the output tone correction section 16. The configuration and processing content of the trapping process section 15 will be described later.

The output tone correction section 16 performs an output tone correction process on the basis of the characteristics of the color image output apparatus 2. The tone reproduction process section 17 performs a tone reproduction process (halftone generation) in which the image is finally separated into pixels and processed to reproduce each tone of the pixels. For a region determined to be a photograph region on the basis of the tag information from the raster data generation section 11, the tone reproduction process section 17 performs a binarization or multi-level dithering process on the screen suitable for tone reproduction.

Figure 2:
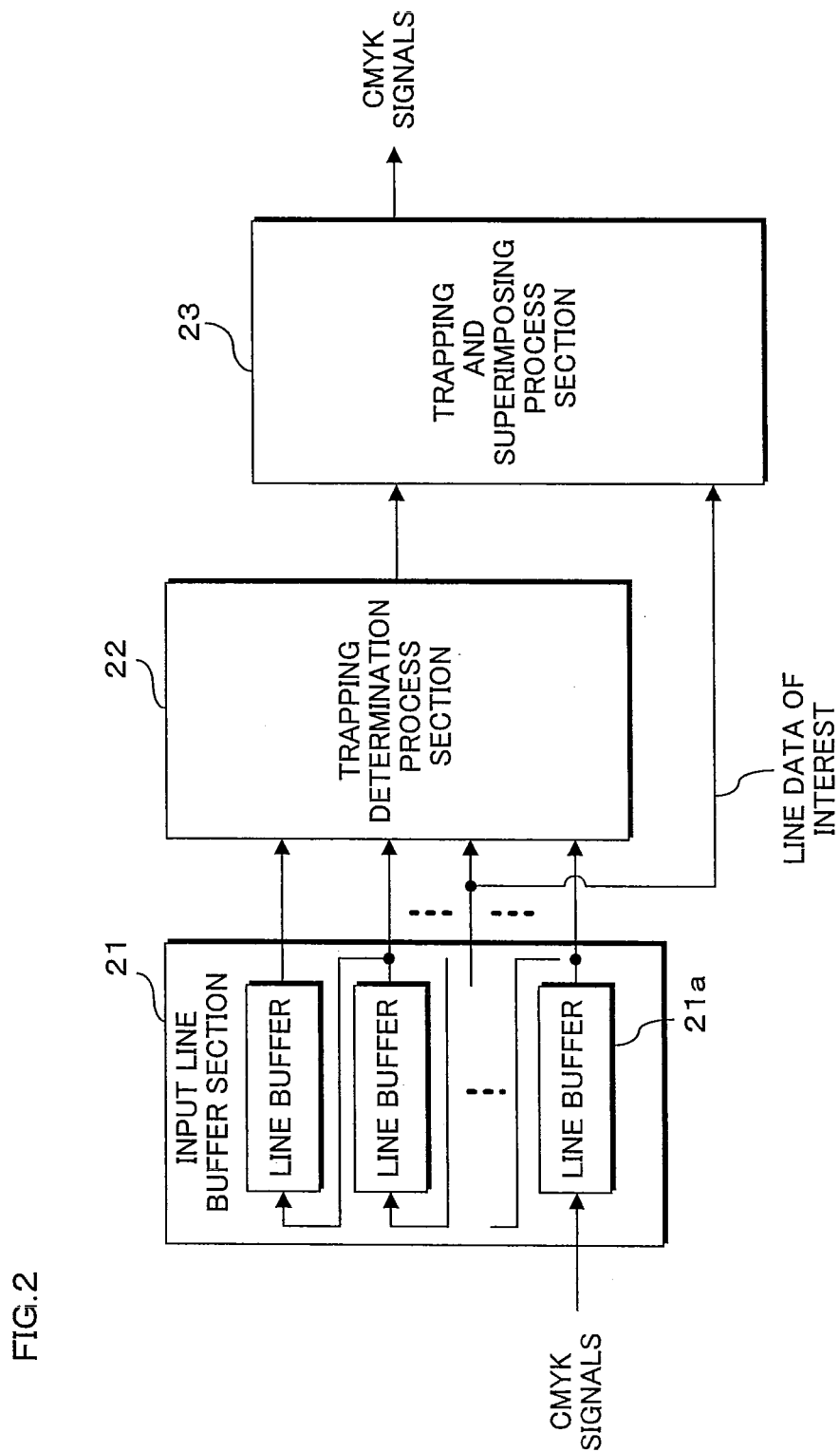
FIG. 2 is a block diagram illustrating the configuration of a trapping process section.

Next, the trapping process section 15 will be explained. FIG. 2 is a block diagram illustrating the configuration of the trapping process section 15. The trapping process section 15 comprises an input line buffer section 21, a trapping determination process section 22, and a trapping and superimposing process section 23. In FIG. 2, although only one input signal line and one output signal line are illustrated, these signal lines are actually provided for each of four color components CMYK.

The input line buffer section 21 includes a plurality of line buffers 21a for temporarily storing the input image data (CMYK signals) output from the selector 14. With a plurality of line buffers 21a, the trapping determination process section 22 in the following stage is able to see the data in a plurality of lines when performing a mask process.

Figure 3:
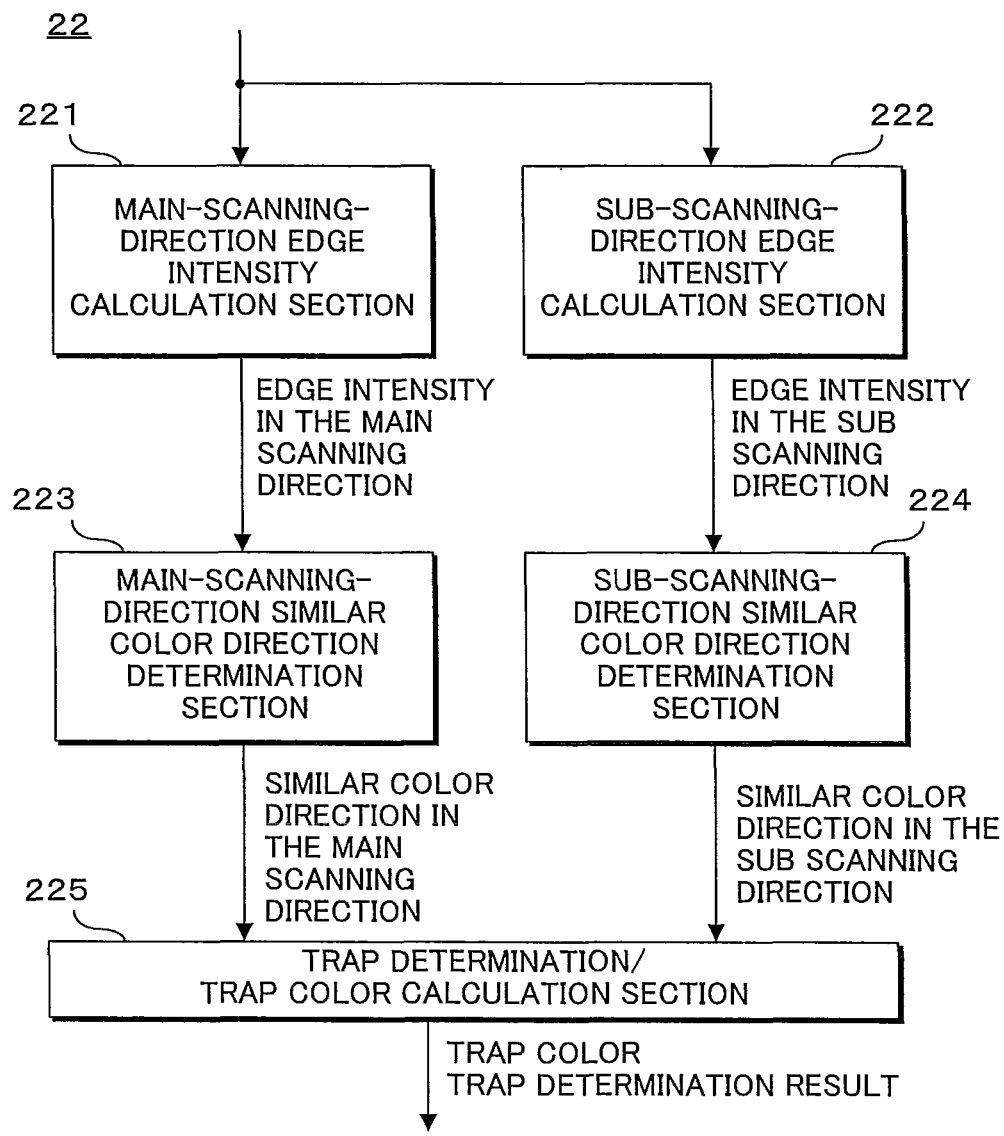
FIG. 3 is a block diagram illustrating the configuration of a trapping determination process section.
Figure 4:
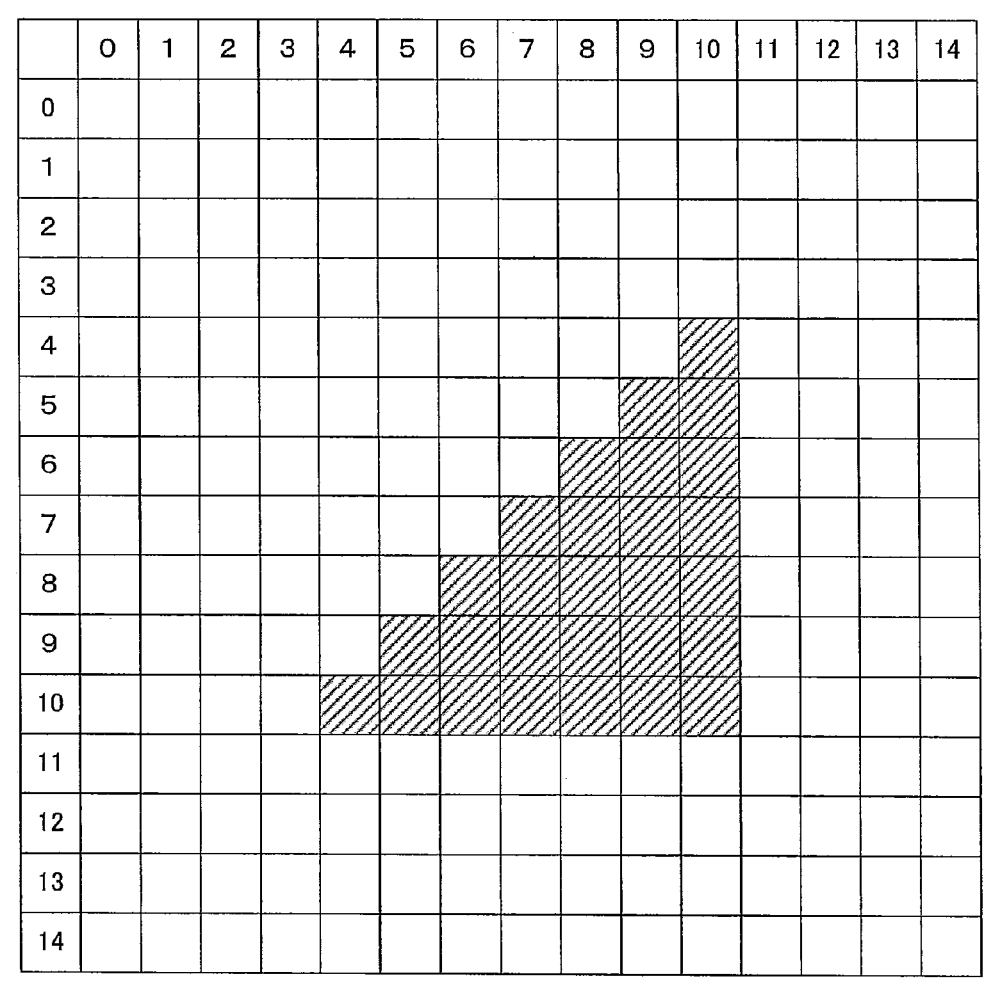

The trapping determination process section 22 makes a trap determination for the input image data, and further determines a trap color. FIG. 3 is a block diagram illustrating the configuration of the trapping determination process section 22. FIG. 4 is a view schematically illustrating one example of input image data. The following explanation is given by assuming that the process is performed for input image data of 15×15 pixels illustrated in FIG. 4. In FIG. 4, the horizontal direction indicates the main scanning direction of the image data, the vertical direction is the sub scanning direction, pixels indicated by hatching show pure color of cyan (C), and pixels indicated as open squares show pure color of magenta (M). Accordingly, the pixel value (M, C) of a pixel containing only magenta (for example, a pixel at the position indicated by main scanning direction 1 and sub scanning direction 1) is (255, 0). The pixel value (M, C) of a pixel containing only cyan (for example, a pixel at the position indicated by main scanning direction 8 and sub scanning direction 8) is (0, 255).

In the following explanation, assuming that other color components (Y and K) are not present, only cyan (C) and magenta (M) are explained.

As illustrated in FIG. 3, the trapping determination process section 22 includes main-scanning-direction and sub-scanning-direction edge intensity calculation sections 221 and 222, main-scanning-direction and sub-scanning-direction similar color direction determination sections 223 and 224, and a trap determination/trap color calculation section 225.

The main-scanning-direction and sub-scanning-direction edge intensity calculation sections 221 and 222 calculate the edge intensities in the main scanning direction and the sub scanning direction, respectively, by using differential filters for each plane of the input image data (image data of each color component). FIGS. 5A and 5B are views schematically illustrating one example of differential filters. FIG. 5A illustrates a differential filter for use in the main scanning direction, and FIG. 5B illustrates a differential filter for use in the sub scanning direction. Although FIGS. 5A and 5B illustrate a 5×5 mask size, the differential filters are not limited to this. With the use of such differential filters, the main-scanning-direction and sub-scanning-direction edge intensity calculation sections 221 and 222 calculate the edge intensities indicating the color difference (the degree of change) between each pixel and each of surrounding pixels in the main scanning direction and in the sub scanning direction for each color component.

A trap width indicates how far from the color boundary of presses (hereinafter referred to as the trapping boundary) trapping is to be performed, and depends on the mask size. Therefore, the differential filter may select an optimum mask size according to the need. In general, when the trap width is increased, the region where colors superimpose one another is larger, and this region is noticeable as a false color, resulting in poor image quality. On the other hand, when the trap width is decreased, a noticeable white gap appears if a large misregistration occurs. Therefore, an optimum trap width and mask size may be determined by considering the balance between the degree of misregistration and the image quality degradation caused by the false color.

FIG. 6 is a view illustrating a part of the results of calculating the edge intensities for the input image data of FIG. 4 by using the differential filters of FIGS. 5A and 5B. In FIG. 6, the numbers on the left side in each pixel indicate the edge intensities calculated for cyan (C), the number on the upper side indicating the edge intensity in the main scanning direction and the number on the lower side indicating the edge intensity in the sub scanning direction. The numbers on the right side in each pixel indicate the edge intensities calculated for magenta (M), the number on the upper side indicating the edge intensity in the main scanning direction and the number on the lower side indicating the edge intensity in the sub scanning direction.

For example, in the case of a pixel at the position indicated by main scanning direction 8 and sub scanning direction 8, the edge intensity for cyan (C) is "765" for both the main scanning direction and the sub scanning direction, while the edge intensity for magenta (M) is "−765". Although it is omitted in FIG. 6, in a pixel distant from an edge (for example, a pixel at the position indicated by main scanning direction 1 and sub scanning direction 1), the edge intensity is "0" for both the main scanning direction and the sub scanning direction. Thus, in the vicinity of the boundary (edge) between cyan (C) and magenta (M) in the input image data, the edge intensity has a value other than 0.

The main-scanning-direction and sub-scanning-direction similar color direction determination sections 223 and 224 determine a similar color direction for each of the main scanning direction and the sub scanning direction for the edge intensities calculated by the edge intensity calculation sections 221 and 222. The similar color direction is a direction in which a pixel having a color similar to the color of a pixel of interest is present. First, the similar color direction determination sections 223 and 224 determine whether or not there is a pixel in which the absolute values of the edge intensities are equal to or greater than a threshold value (for example, 240) and the edge intensities have positive and negative values, respectively, in at least two planes (C and M color components in this embodiment) among C, M, Y and K. Such a pixel is an edge where a white gap appears when a misregistration occurs.

If such a pixel is present, the similar color direction determination sections 223 and 224 determine that an edge is present in the pixel. If such a pixel is not present, the similar color direction determination sections 223 and 224 output "0" as the similar color direction determination result to the trap determination/trap color calculation section 225. The threshold value used here is suitably changed according to how far edge detection is performed.

In the case of a pixel at the position indicated by main scanning direction 4 and sub scanning direction 6 in FIG. 6, since the edge intensity in the main scanning direction is 255 for cyan (C) and −255 for magenta (M), it is determined that an edge is present in this pixel. When it is determined that an edge is present, the similar color direction determination sections 223 and 224 calculate the color difference (col_diff) on the basis of the pixel (pixel of interest) determined to have an edge and the average value of the pixel values of pixels in an increment direction region/decrement direction region (first region/second region adjacent to the pixel of interest).

Figure 7A:
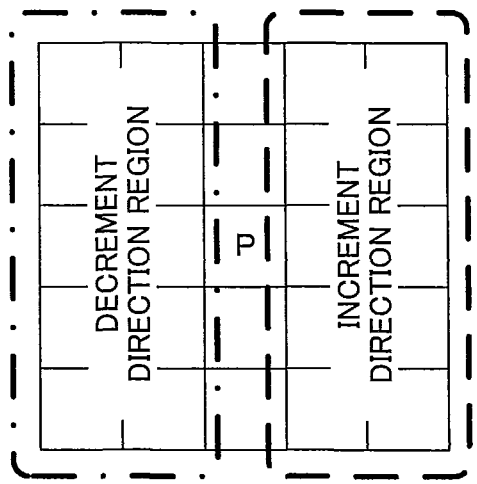
FIGS. 7A and 7B are schematic views for explaining an increment direction region and a decrement direction region.
Figure 7B:
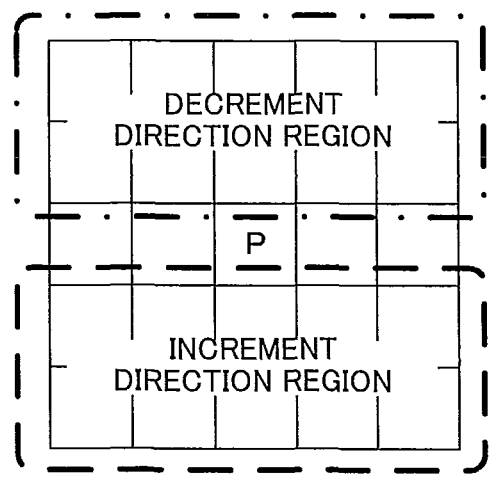

FIGS. 7A and 7B are schematic views for explaining the increment direction region and the decrement direction region. FIG. 7A illustrates the case of the main scanning direction, whereas FIG. 7B illustrates the case of the sub scanning direction. In the main scanning direction, the left side of a pixel P of interest at the center is the decrement direction region, while the right side is the increment direction region. In the sub scanning direction, the upper side of the pixel P of interest at the center is the decrement direction region, while the lower side is the increment direction region.

The color difference (col_diff) between the pixel of interest and the increment direction region or the decrement direction region is calculated by Equation 1.

$$\mathrm{col\_diff} = |C1-C2| + |M1-M2| + |Y1-Y2| + |K1-K2| \quad \text{(Equation 1)}$$

where C1, M1, Y1 and K1 are the pixel values of cyan (C), magenta (M), yellow (Y) and black (K) of the pixel P of interest, and C2, M2, Y2 and K2 are the average value of the pixel values of the pixels in the increment direction region or the decrement direction region.

On the basis of the results of calculating the color difference (col_diff) between the pixel of interest and each of the increment direction region and the decrement direction region by Equation 1 mentioned above, the similar color direction determination sections 223 and 224 determine that a direction with a smaller color difference is a similar color direction. For example, if the color difference calculated on the basis of the pixel P of interest and the increment direction region is smaller than the color difference calculated on the basis of the pixel P of interest and the decrement direction region, then the increment direction is determined to be the similar color direction.

When it is determined that the increment direction is the similar color direction, the similar color direction determination sections 223 and 224 output "1" as the determination result to the trap determination/trap color calculation section 225. Whereas when it is determined that the decrement direction is the similar color direction, the similar color direction determination sections 223 and 224 output "−1" as the determination result to the trap determination/trap color calculation section 225. On the other hand, when it is determined that no edge is present, the similar color direction determination sections 223 and 224 determine that there is no similar color direction, and output "0" as the determination result to the trap determination/trap color calculation section 225.

Figure 8:
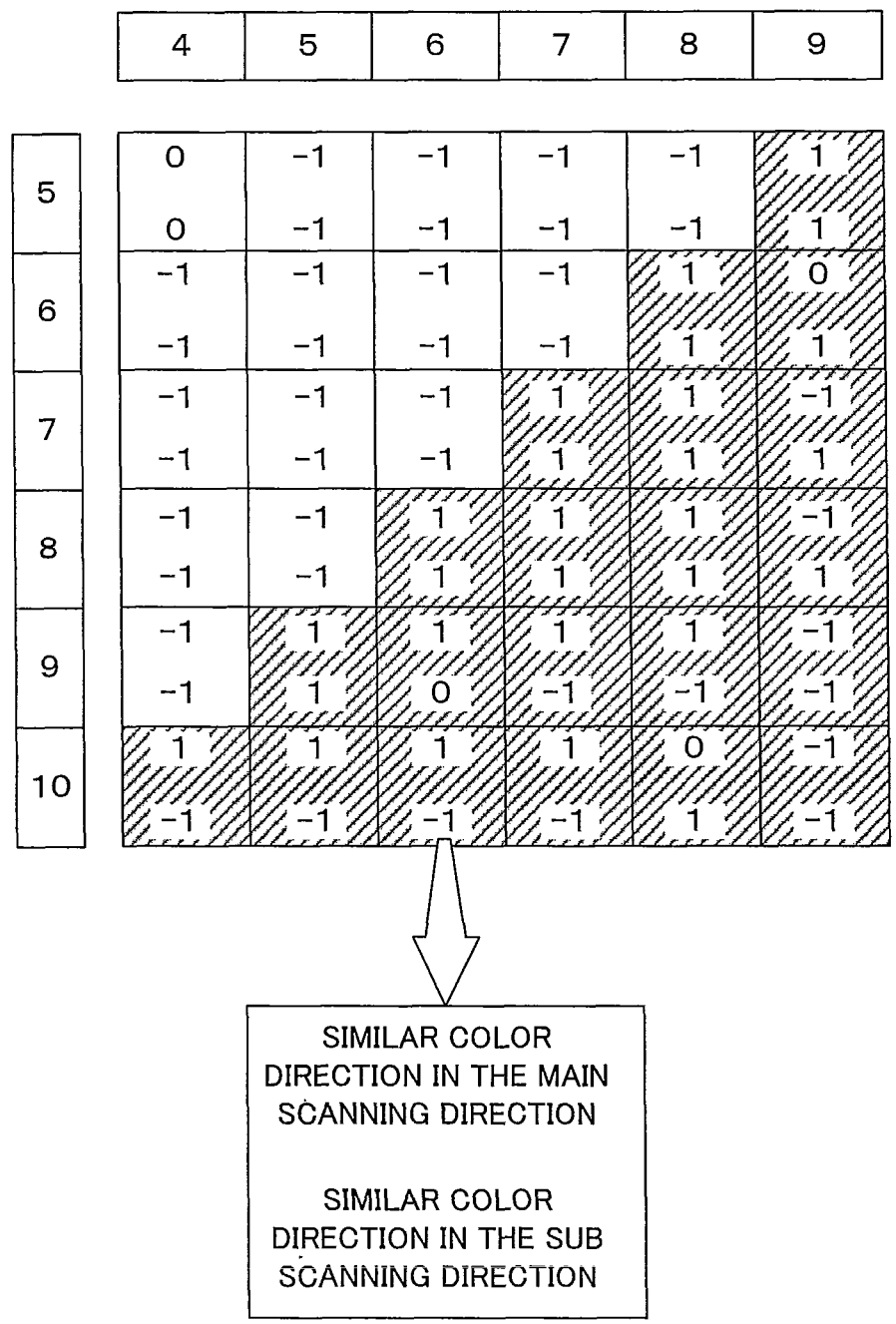
FIG. 8 is a view illustrating a part of the results of determining a similar color direction for the input image data of FIG. 4.

FIG. 8 is a view illustrating a part of the results of making a similar color direction determination for the input image data of FIG. 4. The numbers in each pixel indicate the similar color direction determination results. The upper number indicates the main scanning direction, while the lower number indicates the sub scanning direction. For example, in the case of a pixel at the position indicated by main scanning direction 6 and sub scanning direction 7, the similar color directions in the main scanning direction and the sub scanning direction are both −1, that is, a decrement direction, and therefore the color of the pixel of interest is similar to the color of the pixels in the decrement direction.

The trap determination/trap color calculation section 225 makes a trap determination and determines a trap color on the basis of the processing results in the edge intensity calculation sections 221 and 222 and the similar color direction determination sections 223 and 224. First, the trap determination/trap color calculation section 225 calculates a representative color for the pixels in a mask size.

Figure 9A:
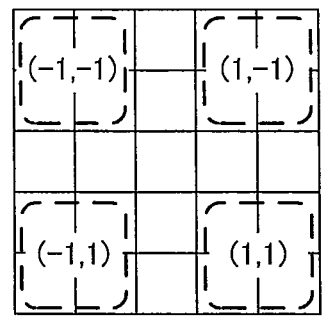
FIGS. 9A, 9B and 9C are schematic views for explaining regions to be referenced when calculating a representative color.
Figure 9B:
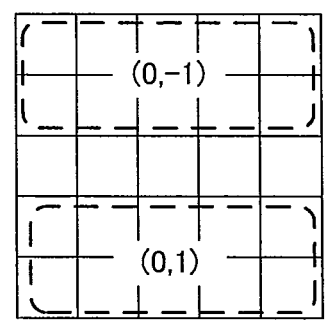
Figure 9C:
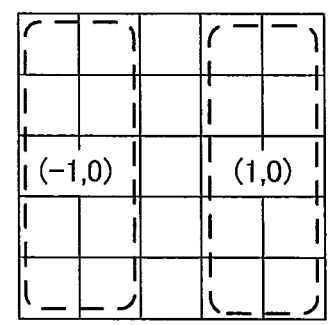
Figure 10:
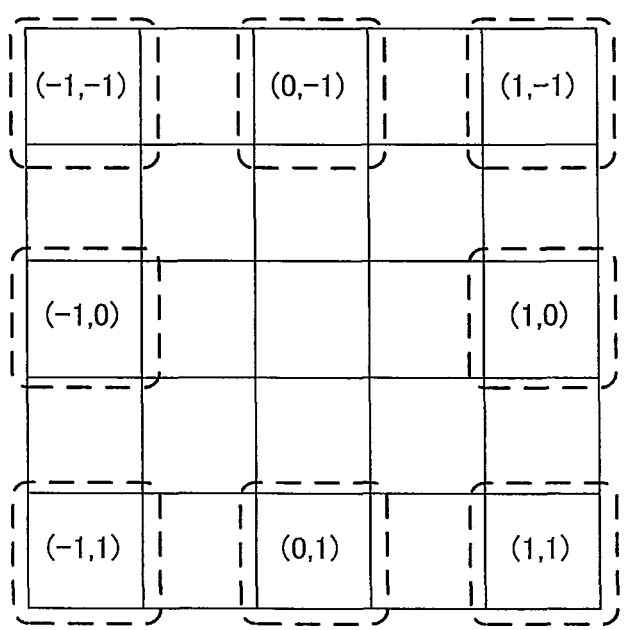
FIG. 10 is a schematic view for explaining regions to be referenced when calculating a representative color.

FIGS. 9A, 9B, 9C and FIG. 10 are schematic views for explaining regions to be referenced when calculating a representative color. FIGS. 9A, 9B, 9C illustrate some cases in which a representative color is calculated on the basis of the average value of the pixel values of a plurality of pixels, and FIG. 10 illustrates a case where a representative color is calculated on the basis of the pixel value of a single pixel. In the following explanation, the method of calculating a representative color by using the regions illustrated in FIGS. 9A, 9B, 9C is referred to as the area type, while the method of FIG. 10 is referred to as the point type.

The trap determination/trap color calculation section 225 calculates representative colors on a side of interest and the opposite side for each color component on the basis of the determination results in the similar color direction determination sections 223 and 224. For example, in FIG. 8, in a pixel at the position indicated by main scanning direction 6 and sub scanning direction 7, the similar color directions in the main scanning direction and the sub scanning directions are both "−1". If a representative color is calculated by the area type method, the representative color (the pixel value of the representative color) on the side of interest is given by the average value of the pixel values in a region (−1, −1) (the first region) illustrated in FIG. 9A. At this time, the representative color on the opposite side is the average value of the pixel values in a region (1, 1) (the second region). In the case where a representative color is calculated by the point type method, the representative color on the side of interest is given by the pixel value at (−1, −1) illustrated in FIG. 10, while the representative color on the opposite side is given by the pixel value at (1, 1). The following explanation will be given on an assumption that representative colors are calculated by the area type method.

Figure 11:
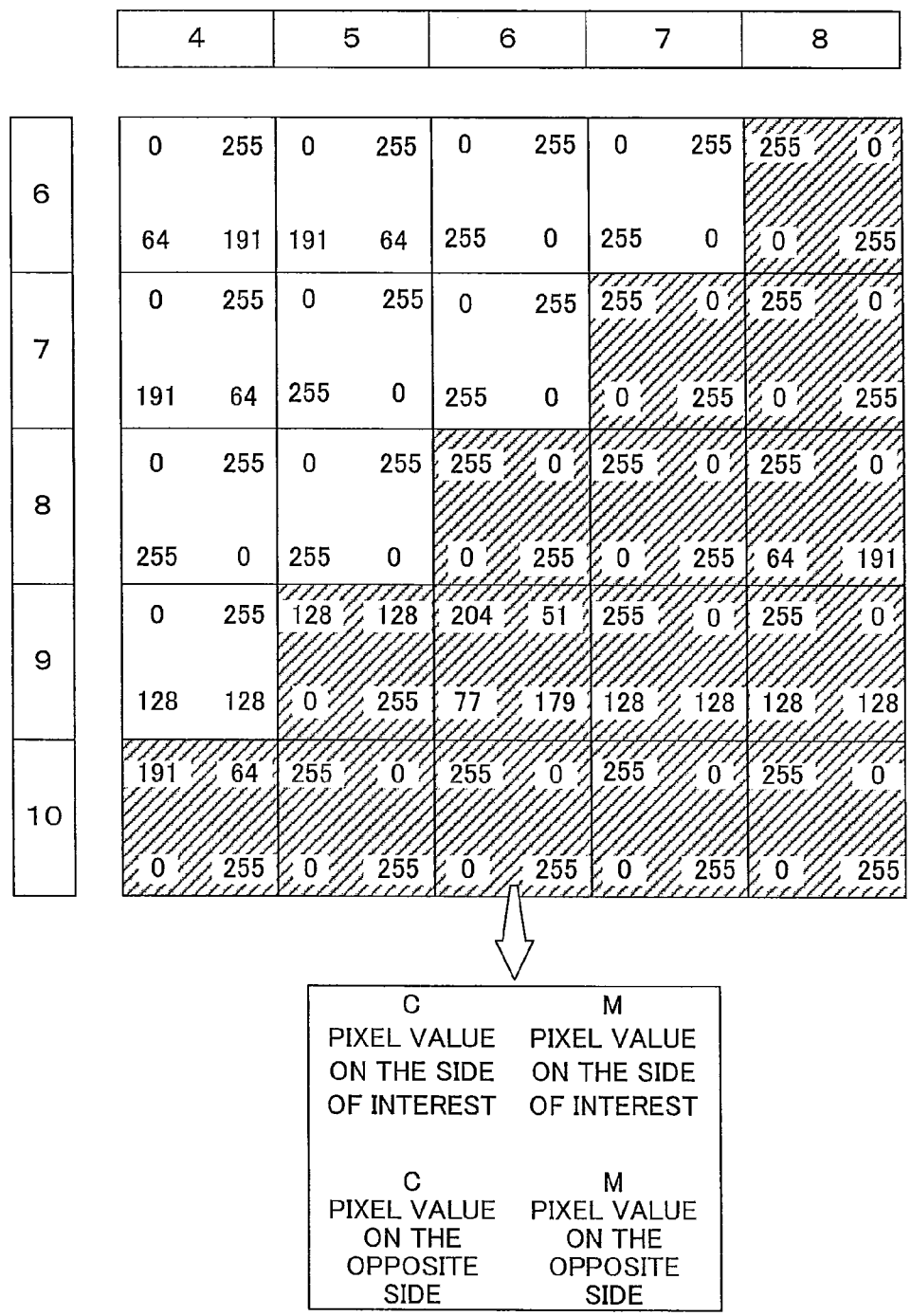
FIG. 11 is a view illustrating a part of the results of calculating representative colors on a side of interest and an opposite side.

FIG. 11 is a view illustrating a part of the results of calculating the representative colors on the side of interest and the opposite side. The numbers in each pixel indicate the pixel values of the calculated representative colors. The numbers on the right side in each pixel indicate the pixel values of representative colors calculated for magenta (M), while the numbers on the left side indicate the pixel values of representative colors calculated for cyan (C). The numbers on the upper side indicate the pixel values of representative colors on the side of interest, while the numbers on the lower side indicate the pixel values of representative colors on the opposite side. For example, in the case of a pixel at the position indicated by main scanning direction 6 and sub scanning direction 7, the representative color on the side of interest is magenta (M), and the representative color on the opposite side is cyan (C).

After calculating the representative colors on the side of interest and the opposite side, the trap determination/trap color calculation section 225 calculates a luminance value L on the basis of Equation 2 through Equation 5 below. (Crep, Mrep, Yrep, Krep) in Equation 2 through Equation 4 represent the pixel values of the representative colors on the side of interest and the opposite side, and these equations are equations for converting CMYK to RGB. Equation 5 is an equation for calculating the luminance value L by using RGB obtained by the conversion.

$$R = 255 - \text{MIN}\left(255, \frac{Crep \times (255 - Krep)}{255} + Krep\right) \quad \text{(Equation 2)}$$

$$G = 255 - \text{MIN}\left(255, \frac{Mrep \times (255 - Krep)}{255} + Krep\right) \quad \text{(Equation 3)}$$

$$B = 255 - \text{MIN}\left(255, \frac{Yrep \times (255 - Krep)}{255} + Krep\right) \quad \text{(Equation 4)}$$

Here, MIN(A, B) indicates a smaller value between A and B.

$$L = 0.29891 \times R + 0.58661 \times G + 0.11448 \times B \quad \text{(Equation 5)}$$

The trap determination/trap color calculation section 225 compares the respective luminance values on the side of interest and the opposite side calculated by the above equations. If the luminance value on the side of interest is lower than the luminance value on the opposite side, the trap determination is enabled to expand the region with higher luminance (region in lighter color). By expanding the region with higher luminance, deformation of the object shape is prevented. When the trap determination is enabled, the trap determination/trap color calculation section 225 determines the representative color in the region on the opposite side, that is, the region with higher luminance, to be a trap color (Ctrap, Mtrap, Ytrap, Ktrap). If the luminance value on the side of interest is higher than the luminance value on the opposite side, the trap determination/trap color calculation section 225 disables a trap determination.

Figure 12:
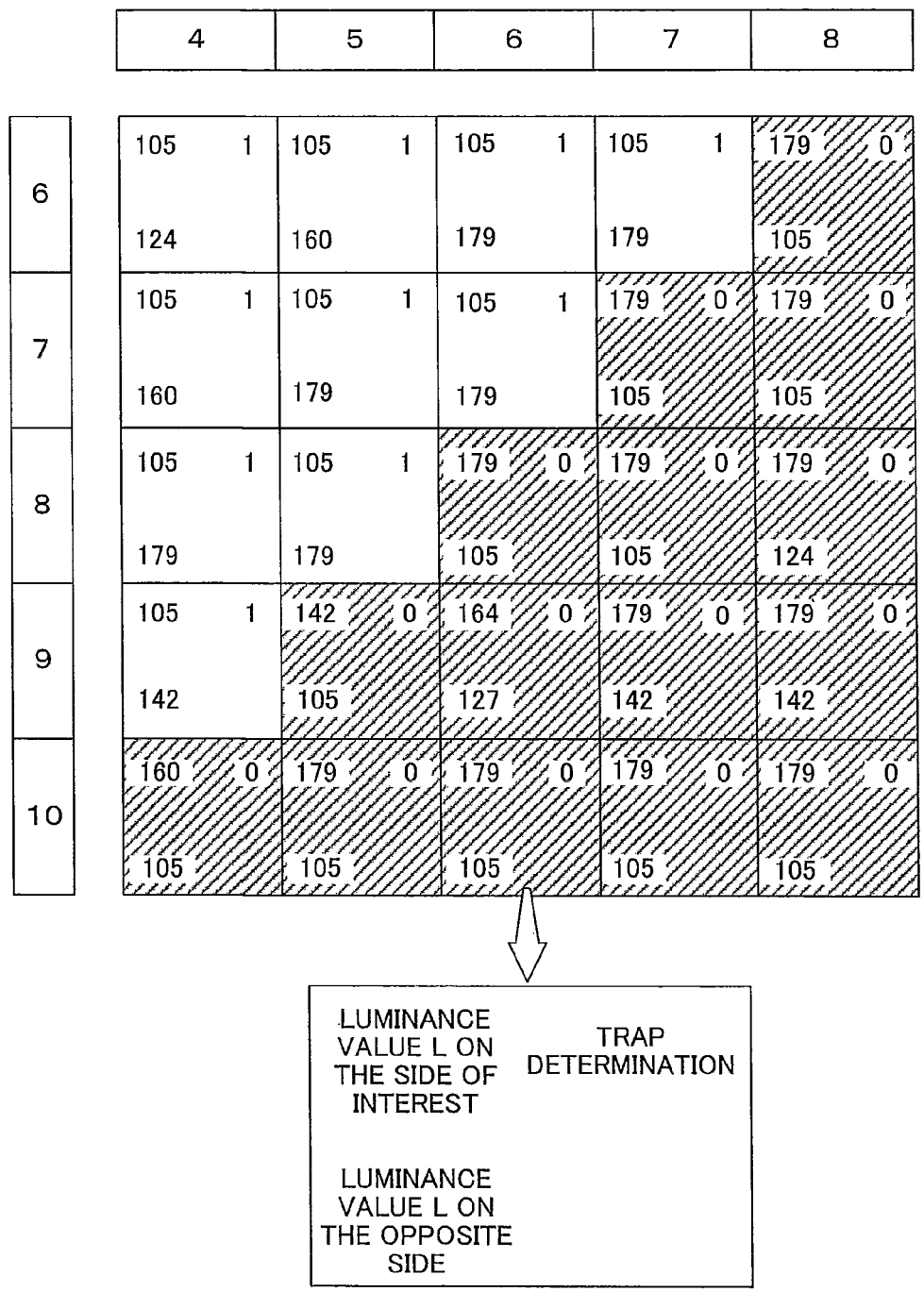
FIG. 12 is a view illustrating a part of the results of a trap determination and luminance values calculated on the basis of the representative colors on the side of interest and the opposite side.

FIG. 12 is a view illustrating a part of the results of the trap determination and luminance values calculated on the basis of the representative colors on the side of interest and the opposite side. The numbers in each pixel indicate the luminance values on the side of interest and the opposite side, and the trap determination result. As for the trap determination result, "1" means that the trap determination is enabled, and "0" means that the trap determination is disabled. For example, in a pixel at the position indicated by main scanning direction 6 and sub scanning direction 7, since the luminance value on the side of interest is lower than the luminance value on the opposite side, the trap determination is enabled, and trap determination result indicates 1. The trap determination/trap color calculation section 225 decides to perform the superimposing process by using the trap color, namely, cyan (C) determined as the trap color for this pixel (see FIG. 11).

The trapping determination process section 22 outputs the above processing results in the trap determination/trap color calculation section 225 to the trapping and superimposing process section 23. In addition, the line data (CMYK signals) stored in the given line buffer 21a in the input line buffer section 21 is input to the trapping and superimposing process section 23 as the line data of interest subject to processing. The line data of interest to be input to the trapping and superimposing process section 23 is not necessarily input from the input line buffer section 21, and may be input through the trapping determination process section 22 to the trapping and superimposing process section 23. In this case, the trapping determination process section 22 inputs the line data of interest together with the processing results in the trap determination/trap color calculation section 225 to the trapping and superimposing process section 23.

The trapping and superimposing process section 23 performs a trapping and superimposing process for the input image data (Cin, Min, Yin, Kin) by using the trap determination result and the trap color (Ctrap, Mtrap, Ytrap, Ktrap) output from the trapping determination process section 22. When the trap determination result is 1, the trapping and superimposing process section 23 takes a larger value between the input image data and the trap color as the pixel value of an output pixel for each color component. More specifically, if the output pixel is denoted as Cout, Mout, Yout, Kout, then Cout=MAX(Cin, Ctrap), Mout=MAX(Min, Mtrap), Yout=MAX(Yin, Ytrap), Kout=MAX(Kin, Ktrap). Here, MAX(A, B) indicates a larger value between A and B.

As for black (K), when superimposing is performed, since there is sometimes a case where the superimposing pixel values are noticeable, the same processes as for other color components are performed, or it may be possible to select not to perform the superimposing process.

When the trap determination result is 0, the trapping and superimposing process section 23 takes the pixel value of the input image data as the pixel value of the output pixel.

Figure 13:
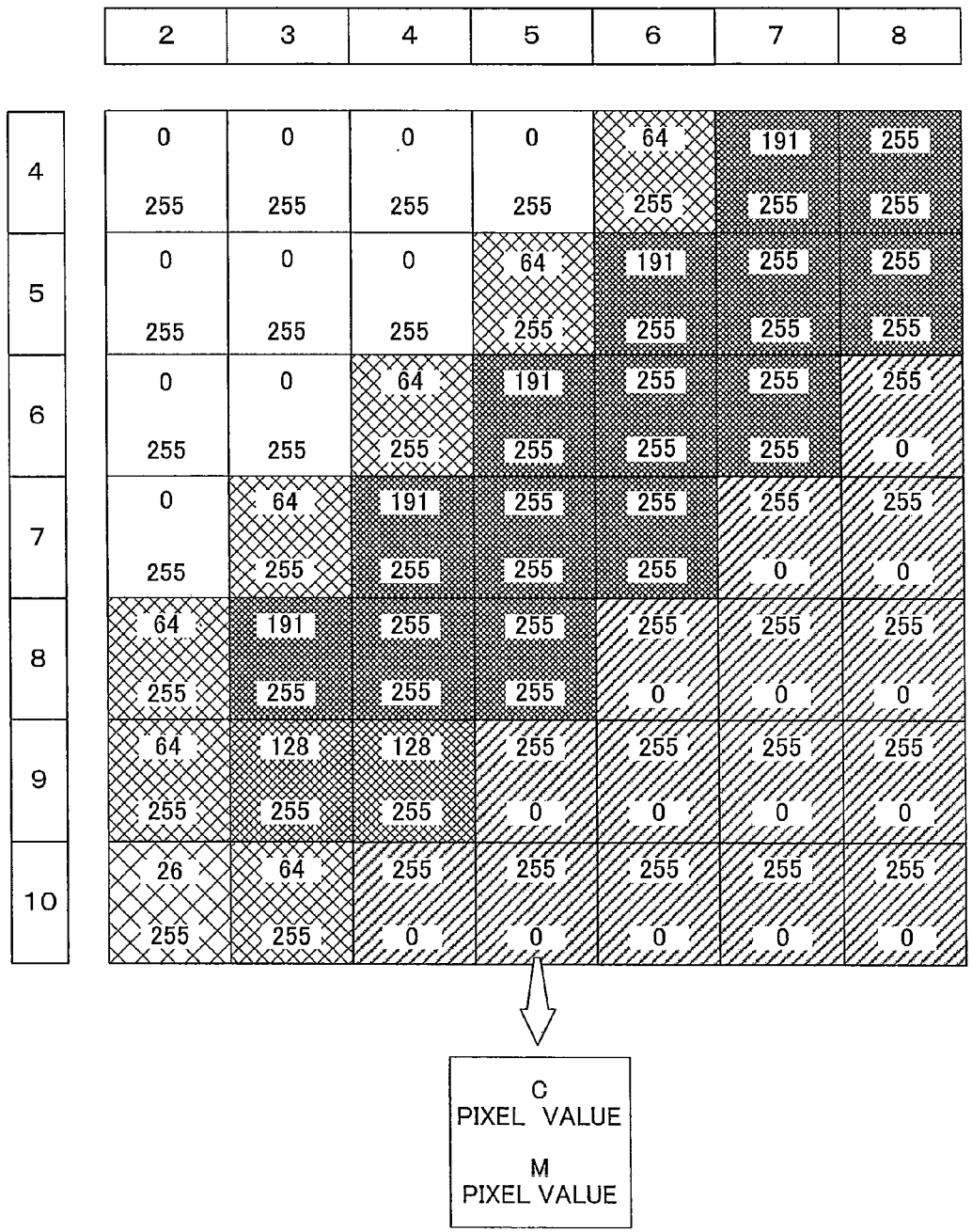
FIG. 13 is a view illustrating a part of the results of performing a trapping and superimposing process.
Figure 14:
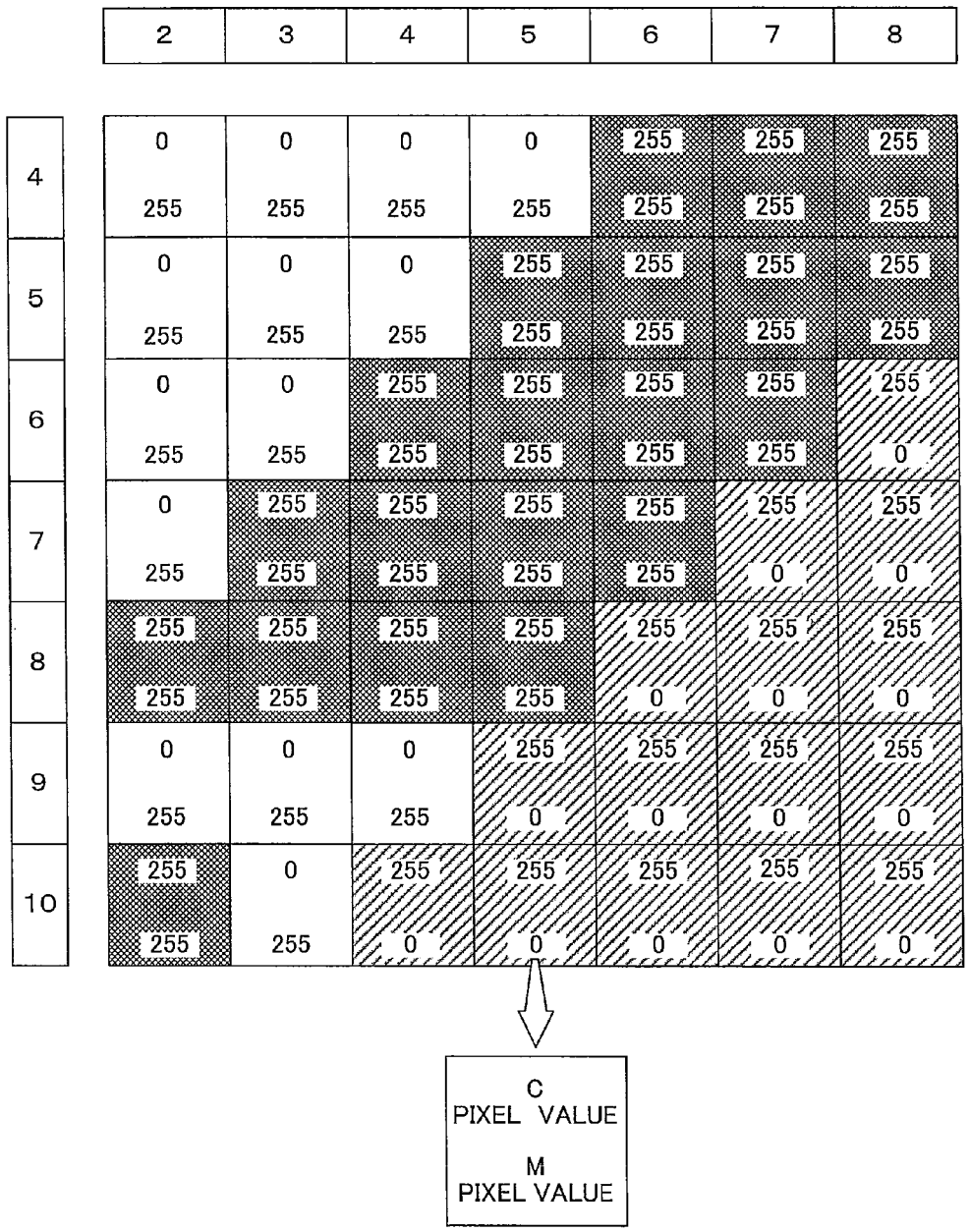
FIG. 14 is a view illustrating a part of the results of performing a trapping and superimposing process.

FIG. 13 and FIG. 14 are views illustrating a part of the results of performing the trapping and superimposing process. FIG. 13 illustrates a case where the trap color is calculated by the area type method as illustrated in FIGS. 9A, 9B and 9C, whereas FIG. 14 illustrates a case where the trap color is calculated by the point type method as illustrated in FIG. 10.

When the trap color is calculated by the area type method, as illustrated in FIG. 13, in the vicinity of the boundary between cyan (C) and magenta (M) in the image, the value of cyan (C) is trapped into the magenta (M) side. Moreover, in the case where the trap color is calculated by the area type method, the more distant from the boundary, the lighter the color will be. This method has the effect of making the superimposing part (trapping part) less noticeable.

On the other hand, when the trap color is calculated by the point type method, as illustrated in FIG. 14, the color does not become lighter. Therefore, the superimposing part is noticeable, but white gaps which appear when a misregistration occurs are less visible.

Hence, the trap determination/trap color calculation section 225 may calculate representative colors by switching the calculation method between the area type and the point type depending on which problem between image quality degradation caused by a false color when a small misregistration occurs and image quality degradation caused by a white gap when a large misregistration occurs should be given priority.

Figure 15A:
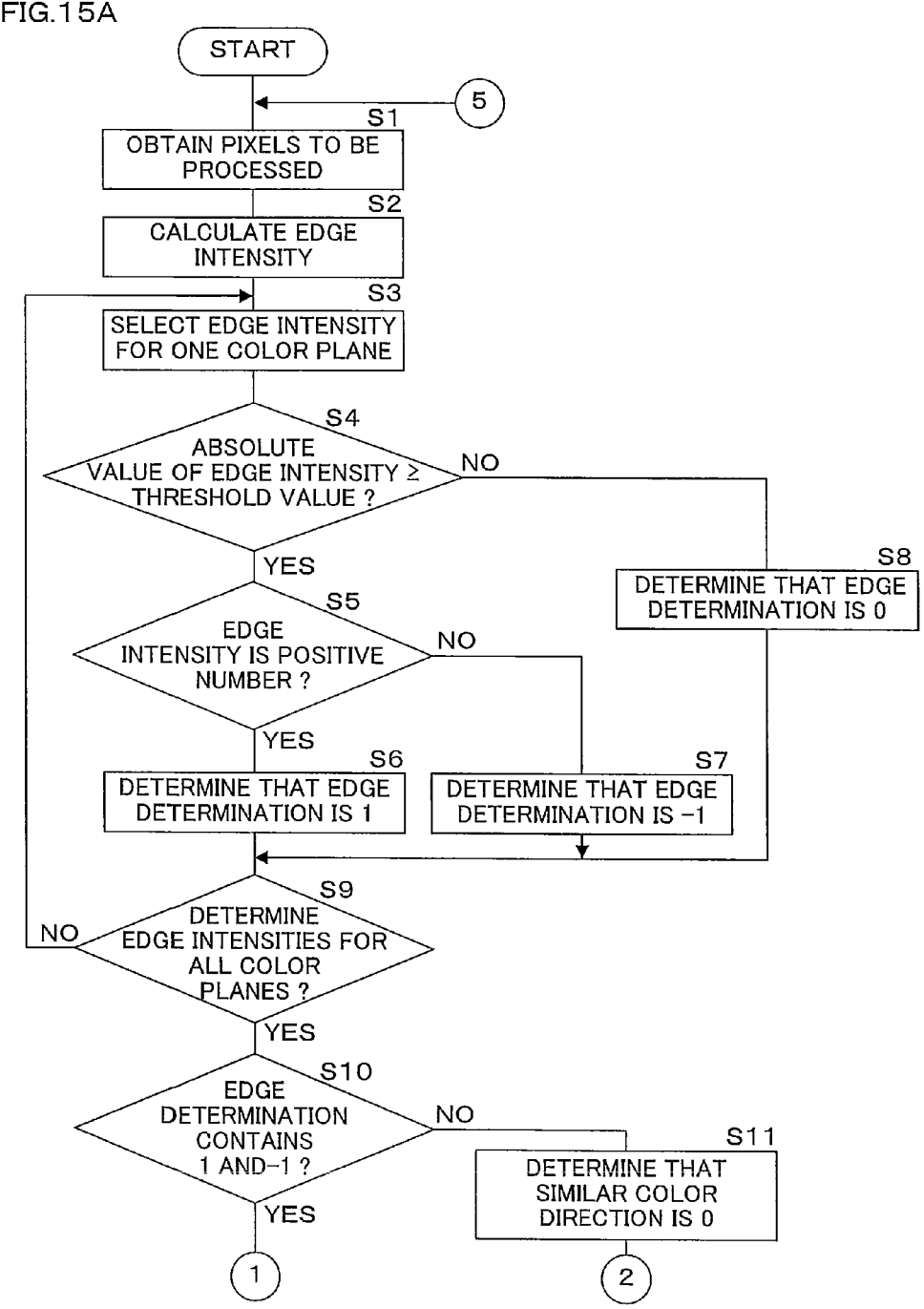
Figure 15C:
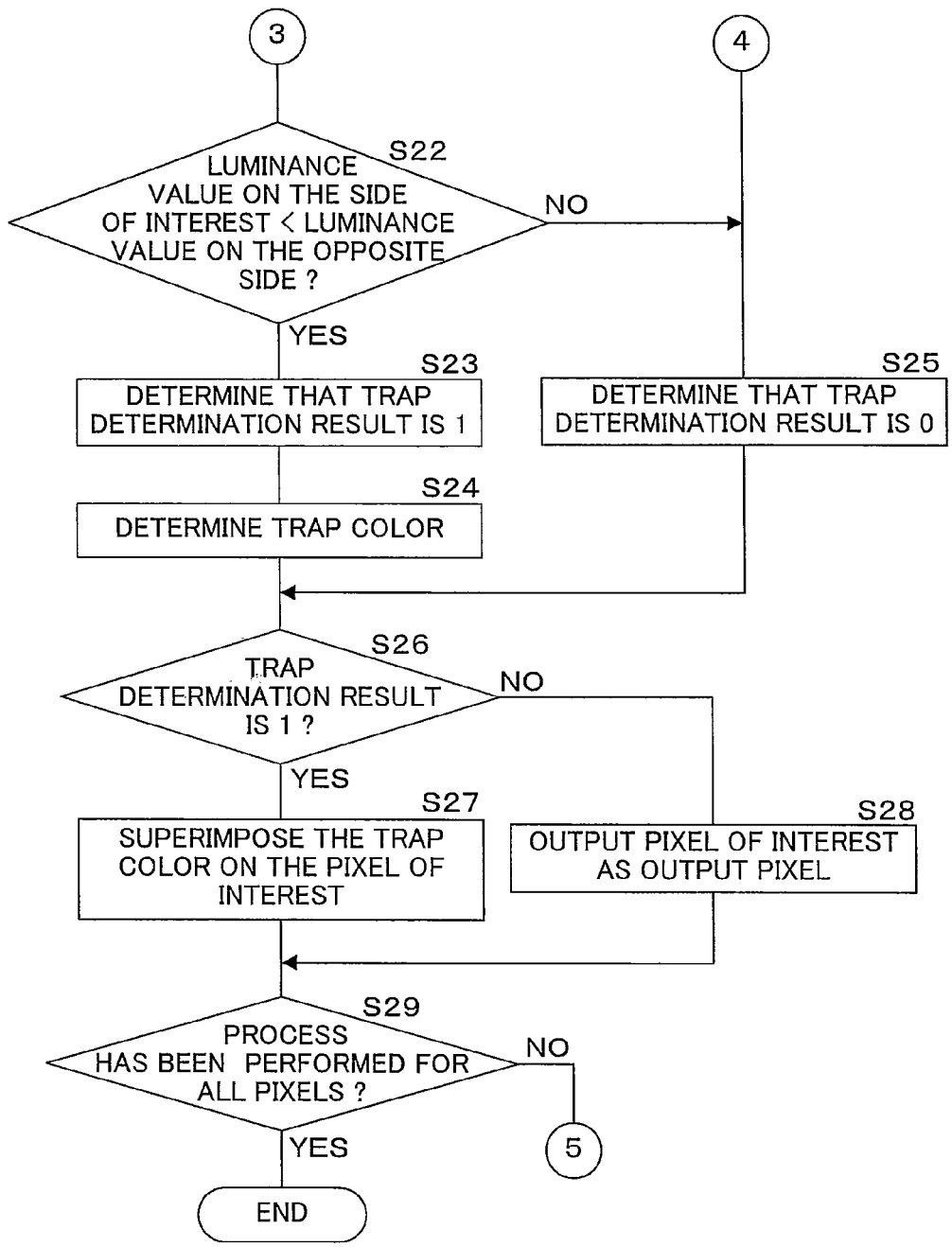

Next, the operation of the above-described color image processing apparatus 1 will be explained. FIGS. 15A, 15B and 15C are flowcharts illustrating the trapping determination process to be performed by the color image processing apparatus 1.

The color image processing apparatus 1 obtains a pixel of interest and surrounding pixels within a given mask size as pixels to be processed for each plane of input image data (S1). The color image processing apparatus 1 calculates an edge intensity in each of the main scanning direction and the sub scanning direction for the pixels in each plane subject to processing by using the differential filters illustrated in FIGS. 5A and 5B (S2).

Next, the color image processing apparatus 1 selects an edge intensity for one of the four planes for each of the main scanning direction and the sub scanning direction (S3), and determines whether or not the absolute value of the selected edge intensity is equal to or greater than a threshold value (for example, 240) (S4). If it is determined that the absolute value of the selected edge intensity is equal to or greater than the threshold value (S4: YES), then the color image processing apparatus 1 determines whether or not the selected edge intensity is a positive number (S5).

If it is determined that the selected edge intensity is a positive number (S5: YES), the color image processing apparatus 1 determines that the edge determination result for the edge intensity in the plane selected in step S3 is 1 (S6). If it is determined that the selected edge intensity is a negative number (S5: NO), the color image processing apparatus 1 determines that the edge determination result for the edge intensity in the plane selected in step S3 is −1 (S7). On the other hand, if it is determined that the absolute value of the selected edge intensity is less than the threshold value (S4: NO), the color image processing apparatus 1 determines that the edge determination result for the edge intensity in the plane selected in step S3 is 0 (S8).

The color image processing apparatus 1 determines whether or not the determinations in steps S4 and S5 have been made for the edge intensities in all of the four planes (S9). If it is determined that the determinations have not been made (S9: NO), the color image processing apparatus 1 returns to the process of step S3, and selects the edge intensities for a plane for which the determinations have not been made (S3). The color image processing apparatus 1 performs the processes of steps S4 to S8 for the selected edge intensities in order to perform the processes of step S4 to S8 for the edge intensities in all the planes.

If it is determined that the determinations in steps S4 and S5 for the edge intensities have been made for all the planes (S9: YES), then the color image processing apparatus 1 determines whether or not the results of edge determination made for the respective planes in steps S6 to S8 contain 1 and −1 (S10). If it is determined that the results of edge determination for the respective planes do not contain 1 or −1 (S10: NO), then the color image processing apparatus 1 determines that the similar color direction determination result is 0 (S11) and moves to the process in step S17.

If it is determined that the results of edge determination for the respective planes contain 1 and −1 (S10: YES), that is, if an edge is present in the pixel of interest subject to processing, then the color image processing apparatus 1 calculates the color difference between the pixel of interest and the increment direction region (S12). Moreover, the color image processing apparatus 1 calculates the color difference between the pixel of interest and the decrement direction region (S13). The color image processing apparatus 1 compares the color difference between the pixel of interest and the increment direction region and the color difference between the pixel of interest and the decrement direction region in order to determine whether the color difference between the pixel of interest and the increment direction region is smaller (S14).

If it is determined that the color difference between the pixel of interest and the increment direction region is smaller (S14: YES), the color image processing apparatus 1 determines that the similar color direction determination result is 1 (S15). If it is determined that the color difference between the pixel of interest and the increment direction region is larger (S14: NO), the color image processing apparatus 1 determines that the similar color direction determination result is −1 (S16). By the way, the above-described processes in steps S2 to S16 with respect to each of the main scanning direction and the sub scanning direction of the input image data may be performed in parallel by the main-scanning-direction edge intensity calculation section 221 and the main-scanning-direction similar color direction determination section 223 and by the sub-scanning-direction edge intensity calculation section 222 and the sub-scanning-direction similar color direction determination section 224.

The color image processing apparatus 1 determines whether or not the similar color direction determination result for the main scanning direction and the similar color direction determination result for the sub scanning direction are both 0 in step S11, S15 or S16 (S17). If it is determined that both of the similar color direction determination results are 0 (S17: YES), the color image processing apparatus 1 moves to the process in step S25.

If it is determined that at least one of the similar color direction determination results is not 0 (S17: NO), the color image processing apparatus 1 calculates a representative color on the side of interest (S18). For example, in FIG. 8, in the pixel at the position indicated by main scanning direction 6 and sub scanning direction 7, the similar color directions for the main scanning direction and the sub scanning direction are both "−1" (the decrement direction region). If a representative color is calculated on the basis of FIGS. 9A, 9B and 9C, the representative color on the side of interest is given by the average value of the pixel values in the region indicated by (−1, −1) in FIG. 9A.

In addition, the color image processing apparatus 1 calculates a representative color on the opposite side (S19). For example, in FIG. 8, in the pixel at the position indicated by main scanning direction 6 and sub scanning direction 7, the similar color directions for the main scanning direction and the sub scanning direction are both "−1". If a representative color is calculated on the basis of FIGS. 9A, 9B and 9C, the representative color on the opposite side is given by the average value of the pixel values in the region indicated by (1, 1) in FIG. 9A.

After calculating the representative colors on the side of interest and the opposite side, the color image processing apparatus 1 calculates a luminance value on the side of interest and a luminance value on the opposite side on the basis of Equation 2 through Equation 5 (S20, S21). Here, the color image processing apparatus 1 may perform the processes of steps S18 to S21 in the reverse order, or at the same time.

The color image processing apparatus 1 compares the luminance value on the side of interest and the luminance value on the opposite side, and determines whether or not the luminance value on the side of interest is lower than the luminance value on the opposite side (S22). If it is determined that the luminance value on the side of interest is lower than the luminance value on the opposite side (S22: YES), the color image processing apparatus 1 enables a trap determination and determines that the trap determination result is 1 (S23), and determines a trap color (S24). Here, the trap color is the representative color in the region on the opposite side.

On the other hand, if it is determined that both of the similar color direction determination results are 0 (S17: YES), or determined that the luminance value on the side of interest is not lower than the luminance value on the opposite side (S22: NO), the color image processing apparatus 1 disables a trap determination and determines that the trap determination result is 0 (S25).

The color image processing apparatus 1 determines whether or not the trap determination result determined in step S23 or S25 is 1 (S26). If it is determined that the trap determination result is 1 (S26: YES), the color image processing apparatus 1 generates an output pixel by superimposing the trap color determined in step S24 on the pixel of interest obtained in step S1 (S27) and outputs it. If it is determined that the trap determination result is 0 (S26: NO), the color image processing apparatus 1 outputs the pixel of interest obtained in step S1 as the output pixel (S28).

The color image processing apparatus 1 determines whether or not the processing has been performed for all the pixels included in the input image data (S29). If it is determined that the processing has not been completed for all the pixels (S29: NO), the color image processing apparatus 1 returns to the process of step S1. If it is determined that the processing has been completed for all the pixels (S29: YES), the color image processing apparatus 1 finishes this processing.

Embodiment 2

Figure 16:
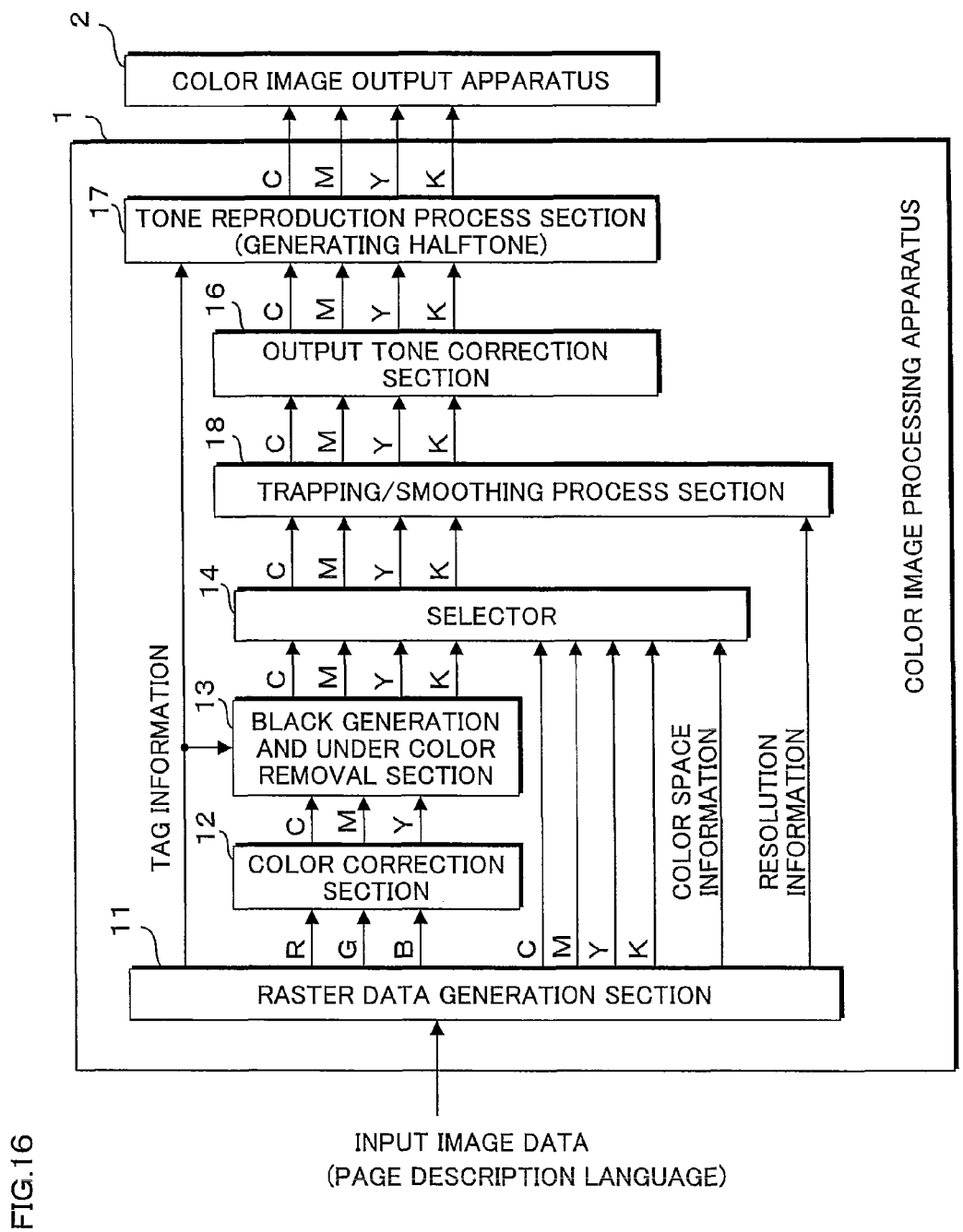
FIG. 16 is a block diagram illustrating the configuration of a color image forming apparatus according to Embodiment 2.

The following will explain a color image forming apparatus according to Embodiment 2. FIG. 16 is a block diagram illustrating the configuration of the color image forming apparatus according to Embodiment 2. The color image forming apparatus of Embodiment 2 is the color image forming apparatus of Embodiment 1 illustrated in FIG. 1, but includes a trapping/smoothing process section 18 instead of the trapping process section 15. Since other structures of the color image forming apparatus of Embodiment 2 are the same as those of the color image forming apparatus of Embodiment 1 illustrated in FIG. 1, explanations thereof will be omitted by designating the same reference codes to the same structures.

Like the raster data generation section 11 of Embodiment 1, the raster data generation section 11 of Embodiment 2 analyzes an input page description language and generates RGB or CMYK raster data. The raster data generation section 11 also obtains color space information of the input image data. When RGB raster data was generated, the raster data generation section 11 outputs the generated raster data to the color correction section 12, whereas when CMYK raster data was generated, the raster data generation section 11 outputs the generated raster data to the selector 14. The raster data generation section 11 also outputs the obtained color space information to the selector 14.

Additionally, the raster data generation section 11 generates tag information indicating to which of a text region, a vector/graphics region, a photograph region and other region each pixel in the raster data belongs to, and outputs it to the black generation and under color removable section 13 and the tone reproduction process section 17.

Further, the raster data generation section 11 obtains resolution information about the input image data and outputs the obtained resolution information to the trapping/smoothing process section 18.

The method of obtaining the resolution information in the color image forming apparatus varies depending on the type of the color image forming apparatus. For example, if the color image forming apparatus is a printer, it obtains the resolution information written in the header of the input image data. If the color image forming apparatus is a multifunction copying machine, it obtains the resolution information set through an operation panel. If the resolution information has not been set, the color image forming apparatus obtains default resolution information (for example, 600 dpi). If the color image forming apparatus is a computer system, it obtains the resolution information set on a read conditions setting screen (scanner driver) for reading an image with a scanner by using a mouse, a keyboard etc.

The raster data generation section 11 and the black generation and under color removal section 13 respectively input CMYK signals to the selector 14 of Embodiment 2, and the selector 14 outputs either of the CMYK signals to the trapping/smoothing process section 18 on the basis of the color space information output from the raster data generation section 11. If the color space information is RGB, then the selector 14 outputs the CMYK signals input from the black generation and under color removal section 13 to the trapping/smoothing process section 18. If the color space information is CMYK, then the selector 14 outputs the CMYK signals input directly from the raster data generation section 11 to the trapping/smoothing process section 18. Thus, if the color space information of the input image data is CMYK, the CMYK signals which were not processed in the color correction section 12 and the black generation and under color removal section 13 are input to the trapping/smoothing process section 18.

The trapping/smoothing process section 18 of Embodiment 2 performs a trapping process for preventing white gaps caused by misregistration and a smoothing process for improving the resolution while reducing blurred pixels and jaggies, according to the resolution information, for the input raster data. Then, the trapping/smoothing process section 18 outputs the processed CMYK signals to the output tone correction section 16.

The trapping/smoothing process section 18 of Embodiment 2 performs the trapping process and the smoothing process, according to the resolution of the input image data and the resolution of an image to be formed by the color image output apparatus 2 (hereinafter referred to as the output image). The configuration and the processing content of the trapping/smoothing process section 18 of Embodiment 2 will be described later.

In the case where the color image forming apparatus is a multi-function peripheral, the resolution selected from the operation panel (if not selected, a default value, for example, 600 dpi) is set for the resolution of the output image. In the case where the color image forming apparatus is implemented by a computer system, the resolution may be set in the print conditions field (the printer driver setting screen).

Figure 17:
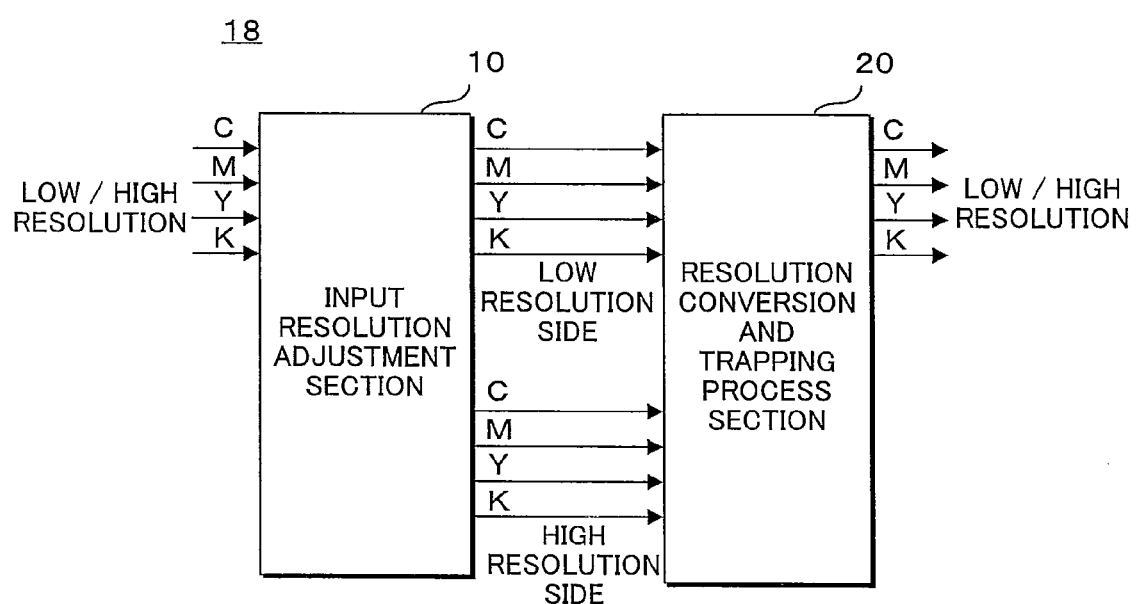
FIG. 17 is a block diagram illustrating the configuration of a trapping/smoothing process section.

Next, the trapping/smoothing process section 18 of Embodiment 2 will be explained. FIG. 17 is a block diagram illustrating the configuration of the trapping/smoothing process section 18. The trapping/smoothing process section 18 includes an input resolution adjustment section 10, and a resolution conversion and trapping process section 20.

Low resolution or high resolution CMYK signals (input image data) are input to the input resolution adjustment section 10 from the selector 14, and the input resolution adjustment section 10 generates low resolution image data for the process in the following stage according to the need. The low resection is, for example, 600 dpi or lower resolution, and the high resolution is, for example, 600 dpi or higher resolution. Here, although 600 dpi is taken as a standard resolution, the numerical value is determined depending on the capacity or number of line buffers held in the resolution conversion and trapping process section 20. In the case where the present invention is implemented by software, the numerical value of the resolution may be determined depending on the size of a memory used in the resolution conversion and trapping process section 20 (like hardware, a necessary memory size is determined depending on the resolution to be processed).

Figure 18:
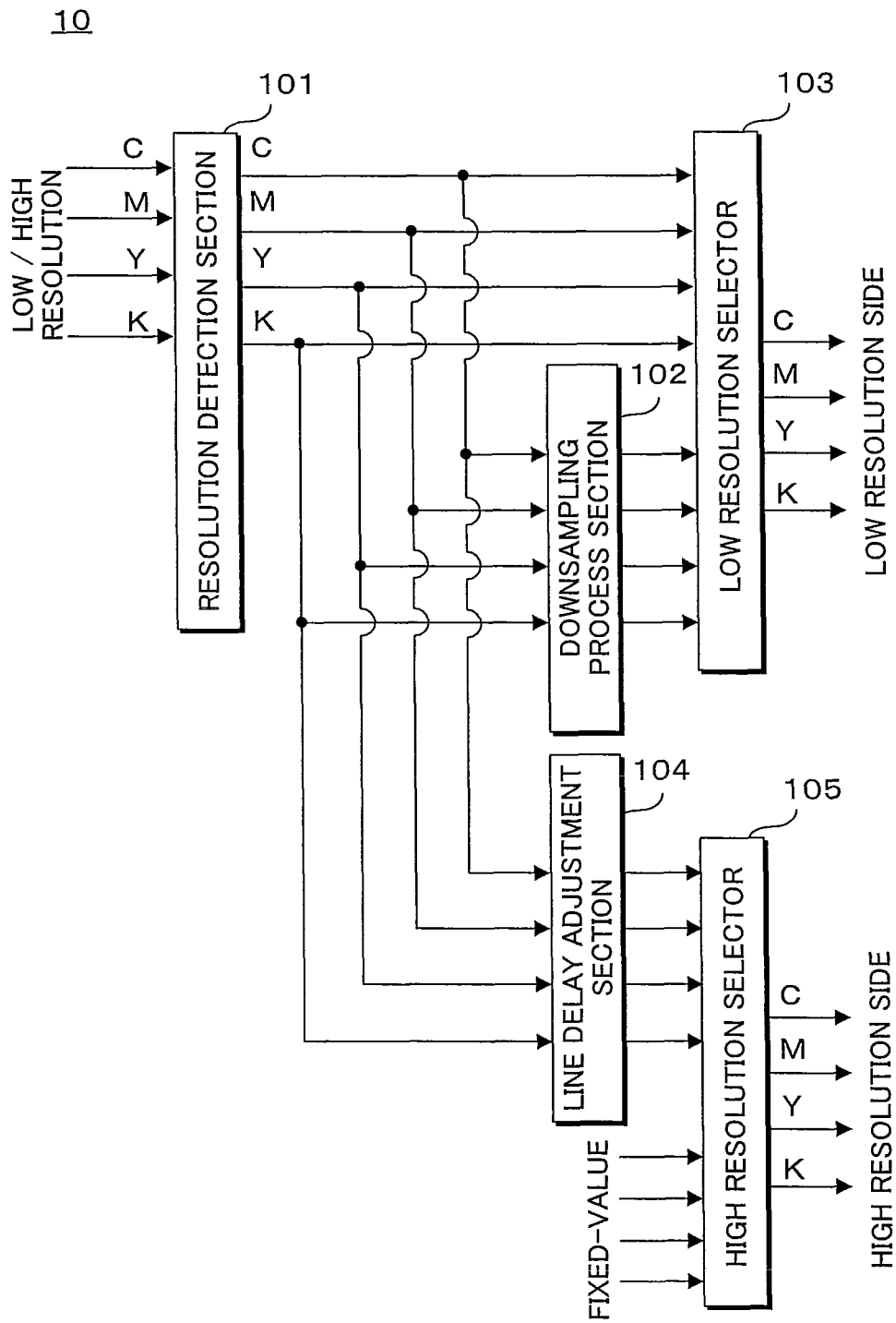
FIG. 18 is a block diagram illustrating the configuration of an input resolution adjustment section.

FIG. 18 is a block diagram illustrating the configuration of the input resolution adjustment section 10. The input resolution adjustment section 10 comprises a resolution detection section 101, a downsampling process section 102, a low resolution selector 103, a line delay adjustment section 104, and a high resolution selector 105. The resolution detection section 101 detects the resolution of the input image data on the basis of the input CMYK signals. The resolution of the input image data may also be detected on the basis of the resolution information input from the raster data generation section 11. The resolution detection section 101 outputs the input CMYK signals to the respective downsampling process section 102, low resolution selector 103 and line delay adjustment section 104. Moreover, the resolution detection section 101 outputs the detected resolution to the low resolution selector 103 and the high resolution selector 105.

If the input image data has high resolution, the downsampling process section 102 performs downsampling for converting the input image data to a low resolution. As the downsampling method, a decimation process (downsampling) or other process is used. For the decimation process, it is preferable to use a nearest neighbor method in which, for example, for a 50% reduction, a pixel on the upper left side is selected in each area of 2×2 pixels. It may be possible to use other method, such as a method which selects the average value in a region according to a scale (for example, the average value of 2×2 pixels for a 50% reduction), a bilinear method, or a bicubic method, instead of the nearest neighbor method.

The CMYK signals are input to the low resolution selector 103 from the resolution detection section 101 and the downsampling process section 102, and the low resolution selector 103 outputs either of the CMYK signals according to the resolution of the input image data. If the input image data has low resolution, the low resolution selector 103 outputs the CMYK singles input from the resolution detection section 101. On the other hand, if the input image data has high resolution, the low resolution selector 103 outputs the CMYK signals converted to low resolution in the downsampling process section 102.

If the input image data has high resolution, the line delay adjustment section 104 adjusts the timings of two signals to be processed in the resolution conversion and trapping process section 20 in the following stage. More specifically, if the input image data has high resolution, the resolution conversion and trapping process section 20 performs processing for the two signals: the CMYK signals on which the downsampling process was performed by the downsampling process section 102; and the original CMYK signals having high resolution. For the CMYK signals having low resolution, since the trapping determination process is performed, there is a time difference between the two signals caused by the execution time of the determination process. Therefore, the line delay adjustment section 104 performs a timing adjustment on a line basis between the two signals. As a mechanism for the timing adjustment, it is preferable to adopt a mechanism using line buffers, or a mechanism in which the signals are input to the memory once by DMA (Direct Memory Access) and output from the memory again at appropriate timing by DMA.

The CMYK signals input from the line delay adjustment section 104 and a fixed-value (for example, 0) signal are input to the high resolution selector 105, and the high resolution selector 105 outputs either of the signals according to the resolution of the input image data or the output image. If the input image data or the output image has low resolution, the high resolution selector 105 outputs the fixed-value signal.

On the other hand, if both of the input image data and the output image have high resolution, the high resolution selector 105 outputs the CMYK signals input from the line delay adjustment section 104. When the fixed-value signal is input to the resolution conversion and trapping process section 20 in the following stage from the high resolution selector 105, the resolution conversion and trapping process section 20 operates to prevent the signal from the high resolution selector 105 from being used in the processing.

The resolution conversion and trapping process section 20 determines whether or not to perform the trapping and superimposing process (hereinafter referred to as the trap determination) for each pixel in the input image data with low resolution output from the low resolution selector 103, and further determines a superimposing color (hereinafter referred to as the trap color) for the superimposing process. In addition, the resolution conversion and trapping process section 20 performs a smoothing process for the input image data with low resolution. Then, the resolution conversion and trapping process section 20 performs the trapping process on the basis of these processing results.

Figure 19:
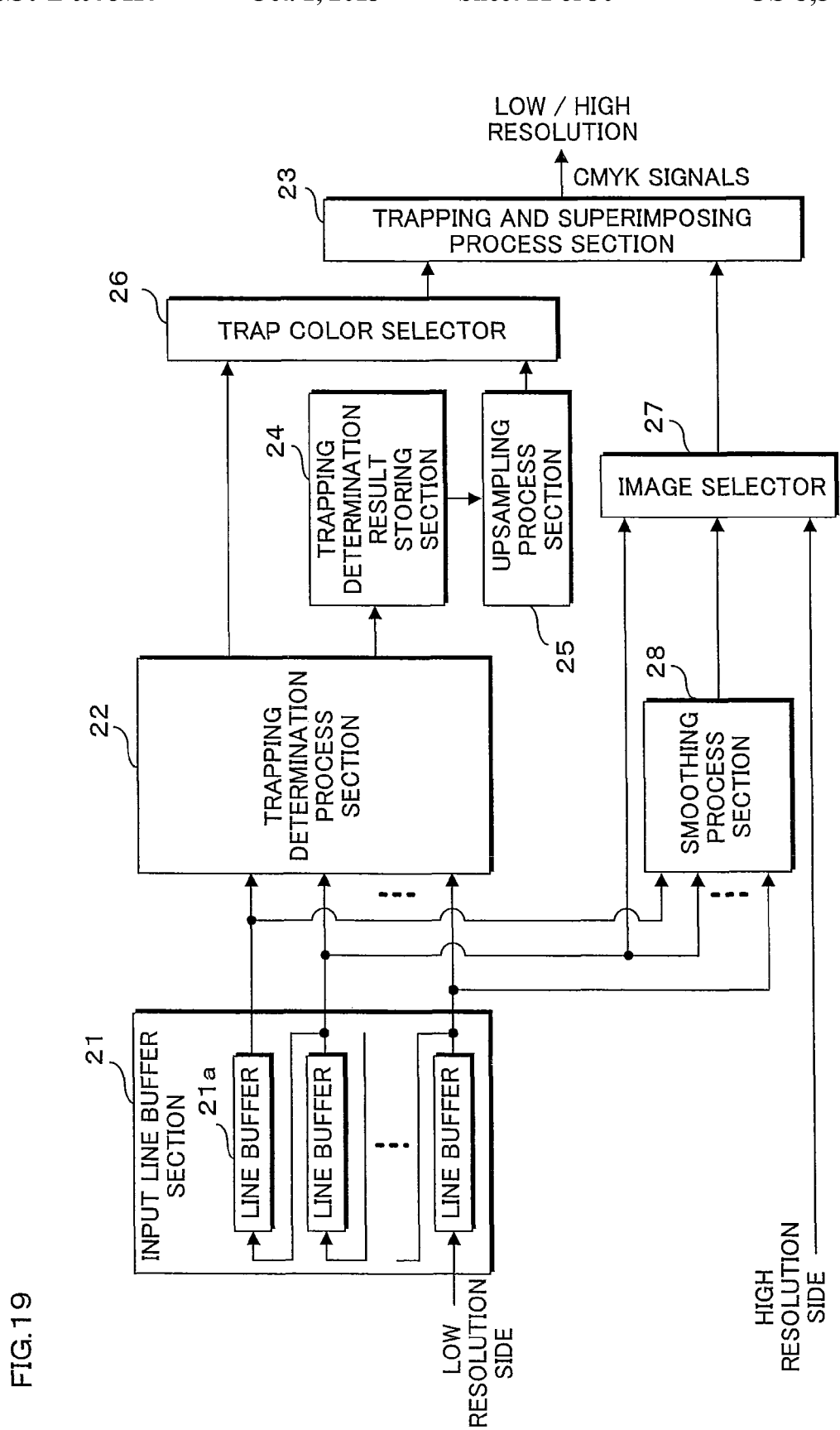
FIG. 19 is a block diagram illustrating the configuration of a resolution conversion and trapping process section.

FIG. 19 is a block diagram illustrating the configuration of the resolution conversion and trapping process section 20. The resolution conversion and trapping process section 20 comprises an input line buffer section 21, a trapping determination process section 22, a trapping and superimposing process section 23, a trapping determination result storing section 24, an upsampling process section 25, a trap color selector 26, an image selector 27, and a smoothing process section 28. In FIG. 19, although only one input signal line and one output signal line are illustrated, each of four color components CMYK has actually these signal lines.

Here, the input line buffer section 21, the trapping determination process section 22 and the trapping and superimposing process section 23 in the resolution conversion and trapping process section 20 have the same configurations and perform the same processing as those of the input line buffer section 21, the trapping determination process section 22 and the trapping and superimposing process section 23 in the trapping process section 15 of Embodiment 1.

The input line buffer section 21 of Embodiment 2 stores the input image data with low resolution output from the low resolution selector 103 temporarily in a plurality of line buffers 21a. With the line buffers 21a, the trapping determination process section 22, the smoothing process section 28 etc. in the following stages are able to see the data in a plurality of lines when performing a mask process etc.

The trapping determination process section 22 of Embodiment 2 performs a trap determination for the input image data with low resolution, and further determines a trap color. The trapping determination process section 22 of Embodiment 2 has the same configuration as the trapping determination process section 22 of Embodiment 1 illustrated in FIG. 3, and makes a trap determination and determines a trap color by the process explained in Embodiment 1. The trapping determination process section 22 of Embodiment 2 outputs the processing results (the trap determination result and the trap color) in the trap determination/trap color calculation section 225 to the trap color selector 26 and the trapping determination result storing section 24.

If the input image data has low resolution and the output image has high resolution, the smoothing process section 28 performs the smoothing process for the input image data of low resolution in order to generate image data having high resolution. The smoothing process section 28 generates pixel data by interpolating data for each 2×2 unit of the input image data (CMYK signals). At this time, the smoothing process section 28 performs processing while reducing blurred pixels and jaggies.

FIG. 20 is a schematic view for explaining data interpolation in the smoothing process. FIG. 20 illustrates a case where the resolutions in the main scanning direction and in the sub scanning direction are respectively increased by two times, and pixels 0, 1, 2, and 3 (hereinafter referred to as the output interpolated pixels) are interpolated for pixels P00, P01, P10, and P11 (hereinafter referred to as the input pixels).

The smoothing process section 28 generates the output interpolated pixels by executing bilinear interpolation for each plane (for each color component). In the case of FIG. 20, the output interpolated pixel 3 is calculated by Equation 6 below. Here, the pixel value of the pixel P00 is represented by $(C_{p00}, M_{p00}, Y_{p00}, K_{p00})$, the pixel value of the pixel P01 is represented by $(C_{p01}, M_{p01}, Y_{p01}, K_{p01})$, the pixel value of the pixel P10 is represented by $(C_{p10}, M_{p10}, Y_{p10}, K_{p10})$, the pixel value of the pixel P11 is represented by $(C_{p11}, M_{p11}, Y_{p11}, K_{p11})$, and the pixel value of the output interpolated pixel 3 is represented by $(C_{b13}, M_{b13}, Y_{b13}, K_{b13})$.

$$C_{b13}=C_{p00}\times(1-u)(1-v)+C_{p10}\times u(1-v)+C_{p01}\times(1-u)v+C_{p11}\times uv \quad \text{(Equation 6)}$$

In Equation 6 above, although only a formula for calculating $C_{b13}$ is written, $M_{b13}$, $Y_{b13}$, and $K_{b13}$ are also calculated by similar formulas. The values of u and v in Equation 6 above are u=0 and v=0 for the output interpolated pixel 0; u=0.5 and v=0 for the output interpolated pixel 1; u=0 and v=0.5 for the output interpolated pixel 2; and u=0.5 and v=0.5 for the output interpolated pixel 3. Next, the smoothing process section 28 calculates the color difference between an output interpolated pixel and an input pixel for each of the output interpolated pixels 0 to 3. This calculation formula is not illustrated here since it is similar to Equation 1 used in Embodiment 1. Further, if the minimum value of the calculated color differences is equal to or less than a threshold value (for example, 140), this input pixel value is used as the output interpolated pixel value. If the minimum value of the calculated color differences is equal to or greater than the threshold value, P10 is used as the pixel value of the output interpolated pixel when v<0.5, and P11 is used when v≥0.5.

Figure 21A:
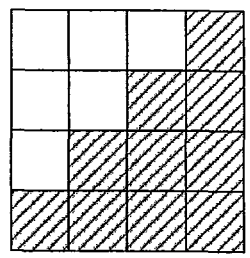
FIGS. 21A, 21B, 21C and 21D are schematic views conceptually illustrating the smoothing process.
Figure 21B:
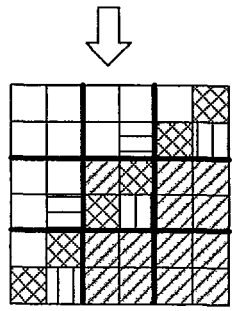
Figure 21C:
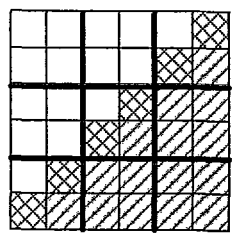
Figure 21D:
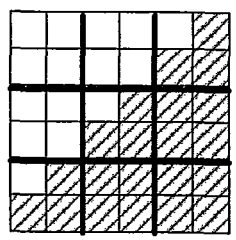

FIGS. 21A, 21B, 21C and 21D are schematic views conceptually illustrating the smoothing process. For example, when increasing the resolution of 4×4 pixels including a boundary region between magenta and cyan as illustrated in FIG. 21A by two times as mentioned above, four output interpolated pixels are generated from four input pixels by bilinear interpolation (see FIG. 21B). If the calculated color difference is closer to either cyan (C) or magenta (M), a pixel of the closer color is copied (see FIG. 21C). If the calculated color difference is an intermediate value between cyan (C) and magenta (M), a pixel on the right side in the input image is copied (see FIG. 21D). With such a smoothing process, even a sloping line is smoothed into a smooth form.

FIG. 22 is a view illustrating the results of bilinear interpolation performed for the input image data of FIG. 4. In each pixel, the upper number indicates the pixel value of cyan (C), and the lower number indicates the pixel value of magenta (M). In FIG. 22, since the pixel values of yellow (y) and black (K) are 0, they are omitted. For example, as illustrated in the pixels in sub scanning direction 21, in the boundary between cyan (C) and magenta (M), the pixels have intermediate values between the pixel values of cyan (C) and magenta (M). FIG. 23 is a view illustrating a part of the processing results of copying a pixel having a color closer to the pixel of interest in the image data of FIG. 22.

If the output data has high resolution, the trapping determination result storing section 24 stores the trap determination result and the trap color as the results of processing performed by the trapping determination process section 22. The upsampling process section 25 reads out the data stored in the trapping determination result storing section 24, and executes an upsampling process. As the upsampling method, for example, Nearest Neighbor is used. The upsampling process section 25 executes upsampling in exact timing with the smoothing process performed by the smoothing process section 28.

FIG. 24 is a view illustrating a part of the results of upsampling performed by the upsampling process section 25. Pixels with pixel value 0 for both cyan (C) and magenta (M) indicate that the trap determination results are 0. For other pixels, the trap determination results are 1, and trap colors at that time are indicated.

The trap color selector 26 and the image selector 27 switch signals to be output to the trapping and superimposing process section 23, according to a combination of the resolutions of image data input to the trapping/smoothing process section 18 and an output image. The processing result in the trapping determination process section 22 and the processing result in the upsampling process section 25 are input to the trap color selector 26. The image data from the high resolution selector 105 in the input tone adjustment section 10, the processing result in the smoothing process section 28 and the image data from the input line buffer section 21 are input to the image selector 27.

If the input image data and the output image have low resolution, the trap color selector 26 outputs the processing result in the trapping determination process section 22 to the trapping and superimposing process section 23. The image selector 27 outputs the pixel of interest in the input image data from the input line buffer section 21. If the input image data has low resolution and the output image has high resolution, the trap color selector 26 outputs the processing result in the upsampling process section 25, and the image selector 27 outputs the processing result in the smoothing process section 28. If the input image data has high resolution and the output image has low resolution, the trap color selector 26 outputs the processing result in the trapping determination process section 22, and the image selector 27 outputs the pixel of interest in the input image data from the input line buffer section 21. If the input image data and the output image have high resolution, the trap color selector 26 outputs the processing result in the upsampling process section 25, and the image selector 27 outputs the image data from the high resolution selector 105.

Since different signals are input according to the resolutions of the input image data and the output image as described above, the trapping and superimposing process section 23 performs the trapping and superimposing process on the basis of the resolutions. If the input image data and the output image have low resolution, the trapping and superimposing process section 23 performs the trapping and superimposing process for the input image data by using the trap determination result and the trap color output from the trapping determination process section 22. When the trap determination result is 1, the trapping and superimposing process section 23 uses the maximum value of the input image data or the trap color as the pixel value of the output pixel. When the trap determination result is 0, the trapping and superimposing process section 23 uses the pixel value of the input image data as the pixel value of the output pixel. For black (K), since when superimposing is performed, the superimposing pixel values are sometimes noticeable, the same processes as for other color components are performed, or it may be possible to select not to perform the superimposing process.

If the input image data has low resolution and the output image has high resolution, the trapping and superimposing process section 23 performs the trapping and superimposing process for the image data obtained from the smoothing process in the smoothing process section 28 with data obtained from the upsampling process in the upsampling process section 25. FIG. 25 is a view illustrating a part of the results of performing the trapping and superimposing process for the image after the smoothing process, on the basis of the upsampling results.

If the input image data has high resolution and the output image has low resolution, the trapping and superimposing process section 23 performs the same processing as in the case where the input image data and the output image have low resolution. If the input image data and the output image have high resolution, the trapping and superimposing process section 23 performs the trapping and superimposing process for the input image data output from the high resolution selector 105 with the data obtained from the upsampling process in the upsampling process section 25.

Thus, in the trapping process, since the trapping determination process is performed for the low resolution side and the trapping and superimposing process is performed for the high resolution side, it is possible to deal with a wide range of input resolution while reducing image quality degradation and suppressing an increase in the circuit scale.

Figure 26:
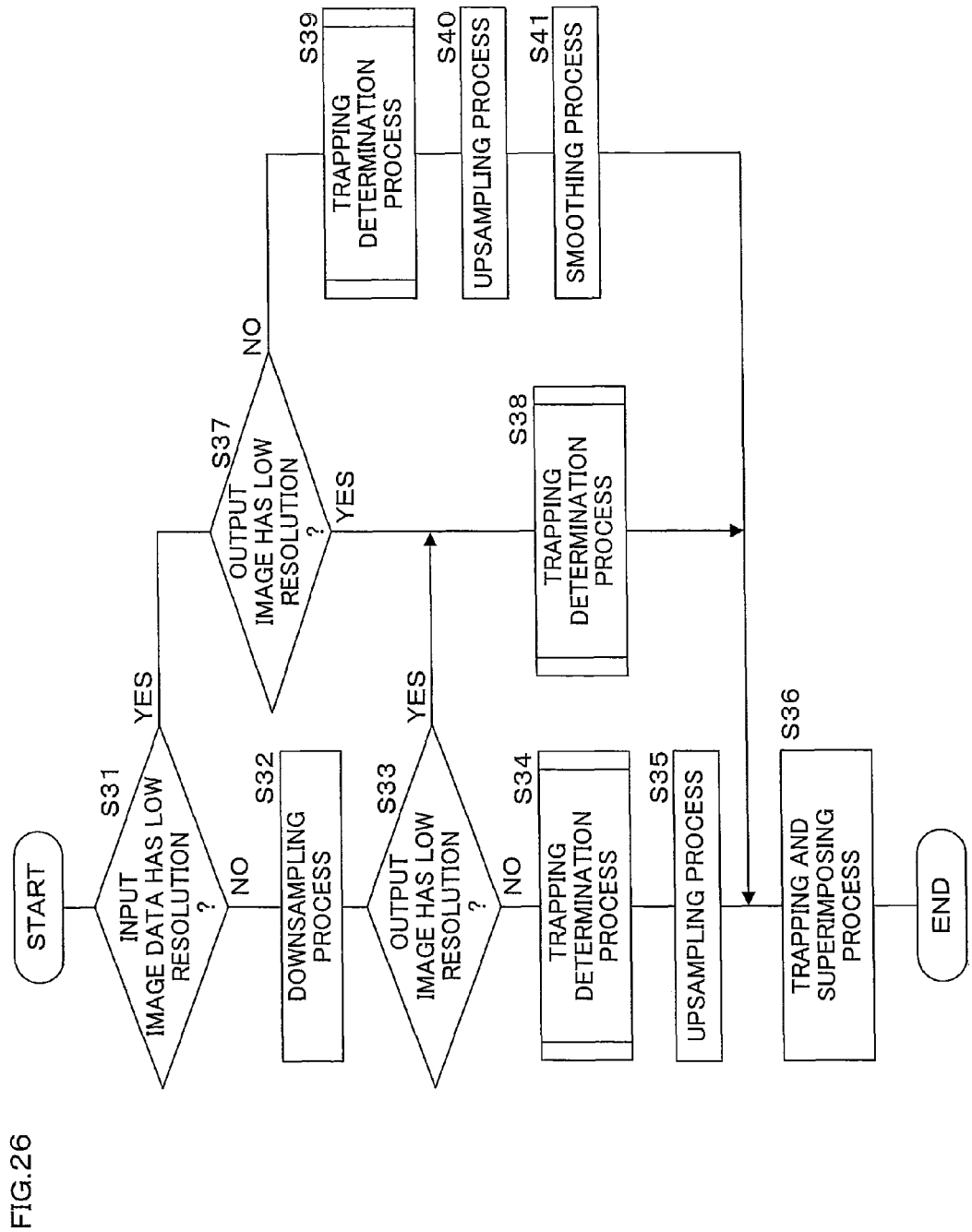
FIG. 26 is a flowchart illustrating the operation of a color image processing apparatus.

Next, the operation of the color image processing apparatus 1 of Embodiment 2 will be explained. FIG. 26 is a flowchart illustrating the operation of the color image processing apparatus 1.

The color image processing apparatus 1 determines whether or not input image data has low resolution (S31). If the input image data does not have low resolution (S31: NO), that is, if the input image data has high resolution, the color image processing apparatus 1 performs a downsampling process for the input image data (S32). For the downsampling process, a decimation process or other process is used as described above.

The color image processing apparatus 1 determines whether or not an output image has low resolution by, for example, obtaining a resolution selected from the operation panel (S33). If the output image does not have low resolution (S33: NO), that is, if the output image has high resolution, the color image processing apparatus 1 performs a trapping determination process for the input image data on which the downsampling process was performed in step S32 (S34). The trapping determination process is a process for making the above-described trap determination and determining a trap color, and is the process explained in Embodiment 1 with reference to FIG. 15A to FIG. 15C.

Next, the color image processing apparatus 1 performs the upsampling process for the trap determination result and the trap color determined in step S34 by using a nearest neighbor technique (S35). Thereafter, the color image processing apparatus 1 performs the trapping and superimposing process for the input image data by using the up-sampled trap determination result and trap color (S36). Then, the color image processing apparatus 1 finishes this processing.

If the input image data has low resolution (S31: YES), like step S33, the color image processing apparatus 1 determines whether or not the output image has low resolution (S37). If the output image has low resolution (S37: YES), the color image processing apparatus 1 performs the trapping determination process for the input image data similarly to step S34 (S38). Thereafter, the color image processing apparatus 1 performs the trapping and superimposing process for the input image data by using the trap determination result and a trap color determined in S38 (S36), and finishes this processing.

If the output image has low resolution in step S33 (S33: YES), the color image processing apparatus 1 performs the process of step S38. Thus, when the output image has low resolution, the color image processing apparatus 1 performs the process of making a trap determination and determining a trap color for the input image data with low resolution, irrespective of the resolution of the input image data, and performs the trapping and superimposing process on the basis of the processing results.

In step S37, if the output image does not have low resolution (S37: NO), that is, if the input image data has low resolution and the output image has high resolution, the color image processing apparatus 1 performs the trapping determination process for the input image data similarly to step S34 (S39). Then, the color image processing apparatus 1 performs an up sampling process similar to that in step S35 for the trap determination result and the trap color determined in step S39 (S40). Thereafter, the color image processing apparatus 1 performs the smoothing process for the input image data having low resolution and generates image data having high resolution (S41). Here, the color image processing apparatus 1 may perform the processes of steps S39 and S40 and the process of step S41 in the reverse order, or at the same time. Thereafter, the color image processing apparatus 1 performs the trapping and superimposing process for the input image data with high resolution generated in step S41 by using the up-sampled trap determination result and trap color (S36). Then, the color image processing apparatus 1 finishes this processing.

Figure 27:
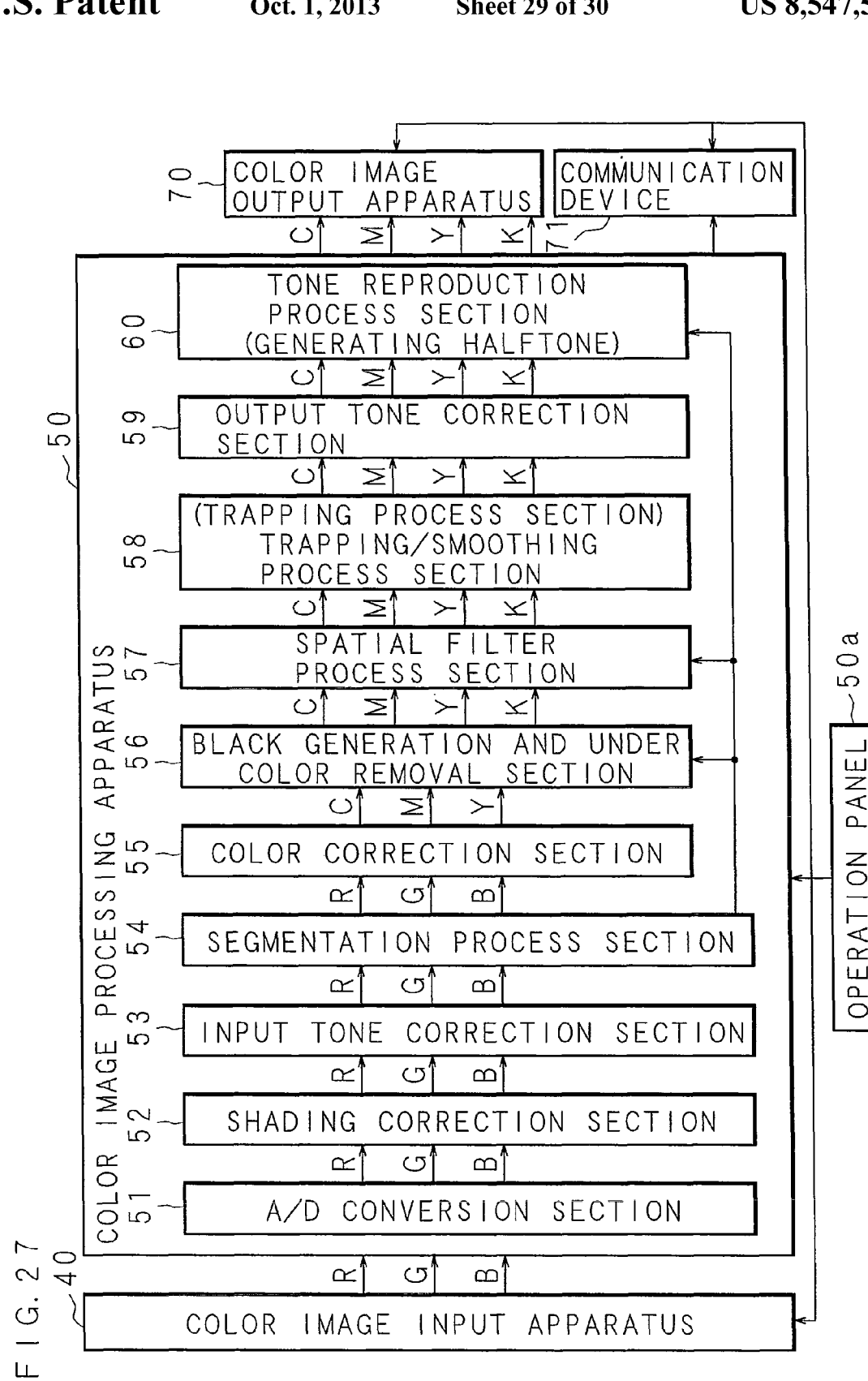
FIG. 27 is a block diagram illustrating the configuration of a digital color multi-function peripheral including an image processing apparatus according to the present invention.

Embodiments 1 and 2 described above explain a case where an image processing apparatus according to the present invention is incorporated into a color image forming apparatus such as a printer, but the image processing apparatus may also be incorporated into a color multi-function peripheral. FIG. 27 is a block diagram illustrating the configuration of a digital color multi-function peripheral incorporating an image processing apparatus according to the present invention.

A color image processing apparatus 50 comprises an A/D conversion section 51, a shading correction section 52, an input tone correction section 53, a segmentation process section 54, a color correction section 55, a black generation and under color removal section 56, a spatial filter process section 57, a trapping/smoothing process section 58, an output tone correction section 59, and a tone reproduction process section 60. The digital color multi-function peripheral is configured by connecting an operation panel 50a, a color image input apparatus 40, a color image output apparatus 70, and a communication device 71 to the color image processing apparatus 50. The operation panel 50a includes a setting button for setting an operation mode of the digital color multi-function peripheral, ten-key, and a display section such as a liquid crystal display.

The color image input apparatus 40 includes, for example, a scanner section comprising a CCD (Charge Coupled Device), reads a reflected light image from a document as RGB (R: red, G: green, B: blue) analog signals by the CCD, and inputs them to the color image processing apparatus 50. The RGB analog signals read by the color image input apparatus 40 are sent to the A/D conversion section 51, the shading correction section 52, the input tone correction section 53, the segmentation process section 54, the color correction section 55, the black generation and under color removal section 56, the spatial filter process section 57, the trapping/smoothing process section 58, the output tone correction section 59 and the tone reproduction process section 60 in this order in the color image processing apparatus 50, and output as a stream to the color image output apparatus 70.

The A/D conversion section 51 converts the RGB analog signals to digital signals. The shading correction section 52 performs the process of removing various distortion produced in an illumination system, an image focusing system, and an image sensing system in the color image input apparatus 40 from the digital RGB signals sent from the A/D conversion section 51. The input tone correction section 53 adjusts the color balance of the RGB signals (RGB reflectance signals) input from the shading correction section 52 and simultaneously performs the process of converting the RGB signals into signals, such as density signals, which are easily treated in the color image processing apparatus 50.

The segmentation process section 54 classifies each pixel in the input image into either of a text region, a halftone region, and a photograph region. The segmentation process section 54 outputs a segmentation class signal, indicating to which region each pixel belongs, to the black generation and under color removal section 56, the spatial filter process section 57 and the tone reproduction process section 60 on the basis of the classification results, and also outputs the input signals output from the input tone correction section 53, without any modification, to the color correction section 55 in the following stage. The methods of processing performed in the color correction section 55, the black generation and under color removal section 56 and the trapping/smoothing process section 58 are the same as those in Embodiments 1 and 2 described above. It is possible to include the trapping process section 15 explained in Embodiment 1, instead of the trapping/smoothing process section 58.

The spatial filter process section 57 performs a process for preventing blur and granular degradation of the output image by correcting the spatial frequency characteristic by performing a spatial filter process using digital filters on the basis of the segmentation class signal for the image data of CMYK signals input from the black generation and under color removal section 56. Like the spatial filter process section 57, the tone reproduction process section 60 performs a given process on the basis of the segmentation class signal for the image data of CMYK signals. For example, in a region classified as text region by the segmentation process section 54, in order to improve reproduction of particularly black text or color text, the high frequency component is sharpened by an edge enhancement process in the spatial filter process performed by the spatial filter process section 57. At the same time, the tone reproduction process section 60 selects a binarization or multi-level dithering process on a high-resolution screen suitable for reproducing high frequency components.

For a region classified as halftone region by the segmentation process section 54, a low-pass filter process for removing input halftone components is performed in the spatial filter process section 57.

After the output tone correction section 59 performs an output tone correction process on the basis of the characteristics of the color image output apparatus 70, the tone reproduction process section 60 performs a tone reproduction process (halftone generation) for finally segmenting the image into pixels and processing the pixels to reproduce each tone of the pixels. For a region classified as a photograph region by the segmentation process section 54, the binarization or multi-level dithering process on the screen suitable for tone reproduction is performed.

The communication device 71 includes a modem or a network card. When sending a facsimile, the communication device 71 performs a transmission procedure with a destination device to secure a transmission ready state, and then reads out image data compressed in a given form (image data read by a scanner) from a memory, performs necessary processes such as converting the compression form, and sends the resulting image data sequentially to the destination device via a communication line.

When receiving a facsimile, the communication device 71 receives image data sent from an originating communication device while following the communication procedure, and inputs the image data to the color image processing apparatus 50. The color image processing apparatus 50 performs a decompression (decode) process for the received image data in a compression/decompression process section (not shown). A rotation process and a resolution conversion process, if necessary, and the output tone correction and the tone reproduction process are performed for the decoded image data, and then the resulting image data is output from the color image output apparatus 70.

The communication device 71 performs data communication with a computer or other digital multi-function peripheral connected to the network via a network card or a LAN cable. Although the digital color multi-function peripheral has been explained, the present invention may also be applied to a monochrome multi-function peripheral.

In addition, the present invention may configure the trapping/smoothing process (or the trapping process) explained in Embodiments 1 and 2 as a computer program to be executed by a computer, and may configure a computer-readable memory product storing this computer program. Consequently, the present invention is able to provide a portable memory product storing program codes (executable-form program, intermediate code program, source program) for implementing the above-described processes.

Figure 28:
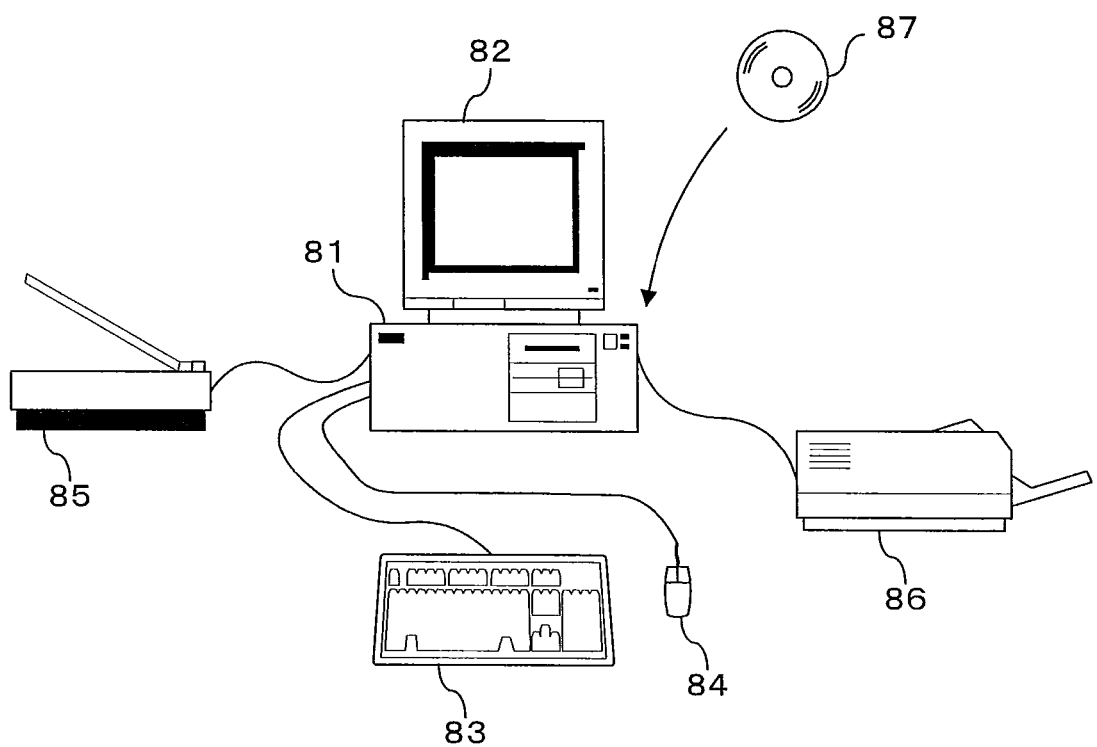
FIG. 28 is a schematic view illustrating a configuration example of a computer system built by installing a computer program stored in a memory product according to the present invention.

FIG. 28 is a schematic view illustrating a configuration example of a computer system built by installing a computer program stored in a memory product according to the present invention. In a computer system 80 illustrated in FIG. 28, a personal computer 81 is connected with peripheral equipment, including an image display apparatus 82 such as a CRT display and a liquid crystal display; a key board 83; a mouse 84; a flat bed scanner 85 as the color image input apparatus 40 (see FIG. 27); and a printer 86 as the color image output apparatus 2 (see FIG. 1). The color image input apparatus 40 is not limited to the flat bed scanner, and it is possible to use, for example, a film scanner and a digital scanner.

The personal computer 81 includes a reading apparatus for reading a computer program stored in a memory product 87 according to the present invention. Therefore, by installing the computer program stored in the memory product 87 according to the present invention in the personal computer 81, it is possible to implement various functions, including the trapping/smoothing process (or the trapping process) explained in Embodiments 1 and 2, with the personal computer 81. More specifically, the personal computer 81 comprises a CPU (Central Processing Unit) or an MPU (Micro Processor Unit), and executes various processes including the trapping/smoothing process (or the trapping process) by executing a given installed (loaded) computer program with the CPU or the MPU.

The memory product 87 may be a program medium which is an external storage device attachable to/detachable from the personal computer 81 and allows the stored program to be read when inserted into the reading apparatus in the personal computer 81. Since the stored program is processed by a micro computer, the memory product 87 may be a program medium such as, for example, a ROM.

In either case, the stored program may be configured in a form accessible and executable by the micro processor. Or, in either case, the micro processor may read a program code, download the read program code in a program storage area (not shown) in the micro computer, and execute the program. The program for downloading is stored in advance in the main apparatus.

Here, the program medium is a memory product removable from the main apparatus, and may be a tape such as a magnetic tape or a cassette tape; a disk such as a magnetic disk, including a flexible disk and a hard disk, and an optical disk, including a CD-ROM, an MO, an MD and a DVD; a card such as an IC card (including a memory card) and an optical card; or a medium fixedly carrying program codes, including a semiconductor memory, such as a mask ROM, an EPROM (Erasable Programmable Read Only Memory), an EEPROM (Electrically Erasable Programmable Read Only Memory), and a flash ROM.

In this embodiment, since the system configuration is connectable to communication networks including the Internet, the memory product may be a medium fluidly carrying program codes, such as by downloading them from a communication network. When program codes are downloaded from a communication network as mentioned above, the computer program for downloading may be stored in advance in the main apparatus or may be installed from another memory product. Further, the present invention may also be implemented in the form of computer data signals embedded in a carrier wave, which is realized by electronically transferring the program codes.

The above memory product may implement above-described image processing method by being read with a program reading apparatus included in a digital color image forming apparatus or the computer system illustrated in FIG. 28.

Preferred embodiments of the present invention have been specifically explained above, but the configurations and operations are not limited to the above-described embodiments and may be changed suitably.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus for performing a process of superimposing a pixel having a plurality of color components on an edge extracted from an input image including a plurality of color components, comprising:
   an edge determination section for determining whether or not a pixel of interest in the input image is a pixel constituting an edge that satisfies a given condition;
   an edge direction determination section for determining a direction in which a surrounding pixel having a color more similar to a color of the pixel of interest than pixels surrounding the pixel of interest is present on the basis of a difference between a pixel value of the pixel of interest and an average value of pixel values of pixels in a first region adjacent to the pixel of interest, and a difference between the pixel value of the pixel of interest and an average value of pixel values of pixels in a second region different from the first region and adjacent to the pixel of interest, when the edge determination section determines that the pixel of interest is a pixel constituting an edge that satisfies the given condition; and a process determination section for determining, on the basis of a direction determined by the edge direction determination section, whether or not to perform a process of superimposing a pixel having a plurality of color components on the pixel of interest;

a determination section for determining color components of a superimposing pixel when the process determination section determines to perform the superimposing process; and a superimposing process section for performing the process of superimposing a pixel having the color components determined by the determination section on the pixel of interest.

2. The image processing apparatus according to claim 1, wherein the edge determination section determines whether or not the pixel of interest is a pixel constituting an edge where a white gap appears when a misregistration occurs between different color components of the input image and page background has been exposed.

3. The image processing apparatus according to claim 1, wherein the edge determination section comprises:

an edge intensity calculation section for calculating, for each pixel of interest, edge intensities indicating a degree of change between a pixel value of the pixel of interest and pixel values of pixels surrounding the pixel of interest by using differential filters for each color component of the input image, and wherein when at least one of the edge intensities of respective color components calculated for each pixel of interest by the edge intensity calculation section is a positive value and an absolute value of the positive value is equal to or greater than a given value and at least one of the edge intensities of the respective color components is a negative value and an absolute value of the negative value is equal to or greater than the given value, the edge determination section determines that the pixel of interest is a pixel constituting an edge that satisfies the given condition.

4. The image processing apparatus according to claim 1, wherein the process determination section comprises:

a representative pixel value calculation section for calculating, on the basis of pixel values of pixels in a first region and a second region preset for the pixel of interest according to a direction determined by the edge direction determination section, a representative pixel value of each of color components in the first region and the second region;

a luminance value calculation section for calculating luminance values in the first region and the second region on the basis of the representative pixel values of the respective color components in the first region and the second region calculated by the representative pixel value calculation section; and a comparing section for comparing the luminance values in the first region and the second region calculated by the luminance value calculation section, and wherein if the luminance value in the first region is smaller than the luminance value in the second region as a result of the comparison in the comparing section, the process determination section determines to perform the superimposing process, and the determination section determines color components of the superimposing pixel on the basis of the representative pixel values of the respective color components in the second region calculated by the representative pixel value calculation section.

5. The image processing apparatus according to claim 4, wherein the representative pixel value calculation section calculates an average value of pixel values of pixels in each of the first region and the second region including a plurality of pixels, or a pixel value of a pixel in each of the first region and the second region including a single pixel, as the representative pixel value of each color component in the first region and the second region.

6. The image processing apparatus according to claim 4, wherein the first region and the second region set for the pixel of interest are regions located at symmetrical positions with respect to the pixel of interest.

7. An image processing apparatus for performing a process of superimposing a pixel having a plurality of color components on an edge extracted from an input image including a plurality of color components, comprising:

a controller to perform operations including:

determining whether or not a pixel of interest in the input image is a pixel constituting an edge that satisfies a given condition;

determining, when it is determined that the pixel of interest is a pixel constituting an edge that satisfies the given condition, a direction in which a surrounding pixel having a color more similar to a color of the pixel of interest than pixels surrounding the pixel of interest is present on the basis of a difference between a pixel value of the pixel of interest and an average value of pixel values of pixels in a first region adjacent to the pixel of interest, and a difference between the pixel value of the pixel of interest and an average value of pixel values of pixels in a second region different from the first region and adjacent to the pixel of interest;

determining, on the basis of the determined direction, whether or not to perform a process of superimposing a pixel having a plurality of color components on the pixel of interest;

determining color components of a superimposing pixel if it is determined to perform the superimposing process; and performing the process of superimposing a pixel having the determined color components on the pixel of interest.

8. The image processing apparatus according to claim 7, wherein the controller determines whether or not the pixel of interest is a pixel constituting an edge where a white gap appears when a misregistration occurs between different color components of the input image and page background has been exposed.

9. The image processing apparatus according to claim 7, wherein the controller calculates, for each pixel of interest, edge intensities indicating a degree of change between a pixel value of the pixel of interest and pixel values of pixels surrounding the pixel of interest by using differential filters for each color component of the input image, and when at least one of the edge intensities of respective color components calculated for each pixel of interest is a positive value and an absolute value of the positive value is equal to or greater than a given value and at least one of the edge intensities of the respective color components is a negative value and an absolute value of the negative value is equal to or greater than the given value, determines that the pixel of interest is a pixel constituting an edge that satisfies the given condition.

10. The image processing apparatus according to claim 7, wherein the controller calculates, on the basis of pixel values of pixels in a first region and a second region preset for the pixel of interest according to a determined direction, a representative pixel value of each of color components in the first region and the second region;

calculates luminance values in the first region and the second region on the basis of the calculated representative pixel values of the respective color components in the first region and the second region;

compares the calculated luminance values in the first region and the second region;

determines to perform the superimposing process if the luminance value in the first region is smaller than the luminance value in the second region as a result of the comparison; and determines color components of the superimposing pixel, on the basis of the calculated representative pixel values of the respective color components in the second region.

11. The image processing apparatus according to claim 10, wherein the controller calculates an average value of pixel values of pixels in each of the first region and the second region including a plurality of pixels, or a pixel value of a pixel in each of the first region and the second region including a single pixel, as the representative pixel value of each color component in the first region and the second region.

12. The image processing apparatus according to claim 10, wherein the first region and the second region set for the pixel of interest are regions located at symmetrical positions with respect to the pixel of interest.

13. An image forming apparatus comprising:

an image processing apparatus according to claim 1; and
an image forming section for forming an output image on the basis of an image processed in the image processing apparatus.

14. An image forming apparatus comprising:

an image processing apparatus according to claim 7; and
an image forming section for forming an output image on the basis of an image processed in the image processing apparatus.

15. A non-transitory computer-readable memory product storing a computer program, wherein said computer program comprises:

an edge determination step of causing a computer to determine, on the basis of input image data stored in a storing section, whether or not a pixel of interest in the input image is a pixel constituting an edge that satisfies a given condition;

an edge direction determination step of causing the computer to determine, when it is determined in the edge determination step that the pixel of interest is a pixel constituting an edge that satisfies the given condition, a direction in which a surrounding pixel having a color more similar to a color of the pixel of interest than pixels surrounding the pixel of interest is present, on the basis of a difference between a pixel value of the pixel of interest and an average value of pixel values of pixels in a first region adjacent to the pixel of interest, and a difference between the pixel value of the pixel of interest and an average value of pixel values of pixels in a second region different from the first region and adjacent to the pixel of interest;

a process determination step of causing the computer to determine, on the basis of the direction determined in the edge direction determination step, whether or not to perform a process of superimposing a pixel having a plurality of color components on the pixel of interest;

a determination step of causing the computer to determine, on the basis of pixel values of the surrounding pixels, color components of a superimposing pixel when it is determined in the process determination step to perform the superimposing process; and a superimposing process step of causing the computer to perform the process of superimposing a pixel having the color components determined in the determination step on the pixel of interest.

* * * * *